United States Patent
Wentink

(10) Patent No.: US 10,051,516 B2
(45) Date of Patent: Aug. 14, 2018

(54) WI-FI COMPATIBLE CHANNEL ACCESS

(71) Applicant: QUALCOMM Incorporated, San Diego, CA (US)

(72) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 14/994,604

(22) Filed: Jan. 13, 2016

(65) Prior Publication Data

US 2016/0212656 A1 Jul. 21, 2016

Related U.S. Application Data

(60) Provisional application No. 62/104,001, filed on Jan. 15, 2015, provisional application No. 62/183,619, (Continued)

(51) Int. Cl.
*H04W 74/08* (2009.01)
*H04W 28/04* (2009.01)
(Continued)

(52) U.S. Cl.
CPC .......... *H04W 28/044* (2013.01); *H04W 16/14* (2013.01); *H04W 74/085* (2013.01);
(Continued)

(58) Field of Classification Search
CPC ............... H04W 28/044; H04W 16/14; H04W 74/0808; H04W 74/0816; H04W 74/085;
(Continued)

(56) References Cited

U.S. PATENT DOCUMENTS 6,965,942 B1 * 11/2005 Young ................ H04W 74/085
370/447
7,826,838 B1   11/2010 Nanda et al.
(Continued)

FOREIGN PATENT DOCUMENTS

WO    WO-2014036896 A1    3/2014

OTHER PUBLICATIONS

Alcatel (Considerations on LBT Enhancements for Licensed-Assisted Access, Aug. 6-10, 2014, and herein after Alcatel). 3GPP TSG RAN WG1 Meeting #78 bis.*
(Continued)

*Primary Examiner* — Kwang B Yao
*Assistant Examiner* — Hardikkumar Patel
(74) *Attorney, Agent, or Firm* — Paradice and Li, LLP

(57) ABSTRACT

Systems and methods are disclosed that may ensure equal medium access between a first wireless device associated with a load based equipment (LBE) protocol and a number of second wireless devices associated with an enhanced distributed channel access (EDCA). The first wireless device may determine a level of contention associated with gaining access to a wireless medium, select a contention window size based, at least in part, on the determined level of contention, and select, for a medium access contention operation, a random back-off number from a range of numbers defined by the selected contention window size.

28 Claims, 18 Drawing Sheets

Related U.S. Application Data filed on Jun. 23, 2015, provisional application No. 62/184,043, filed on Jun. 24, 2015, provisional application No. 62/203,278, filed on Aug. 10, 2015, provisional application No. 62/215,494, filed on Sep. 8, 2015, provisional application No. 62/239,450, filed on Oct. 9, 2015, provisional application No. 62/252,947, filed on Nov. 9, 2015.

(51) Int. Cl.
*H04W 16/14* (2009.01)
*H04W 84/12* (2009.01)
*H04W 88/02* (2009.01)

(52) U.S. Cl.
CPC ... *H04W 74/0808* (2013.01); *H04W 74/0816* (2013.01); *H04W 84/12* (2013.01); *H04W 88/02* (2013.01)

(58) Field of Classification Search
CPC ..... H04W 84/12; H04W 88/02; H04W 74/08; H04W 24/08; H04W 28/04; H04W 52/02; H04W 84/02; H04L 29/02; H04L 12/26; H04L 12/28; H04L 12/43; H04J 1/16; G06F 15/16
See application file for complete search history.

(56) References Cited

U.S. PATENT DOCUMENTS

| | | | |
|---|---|---|---|
| 9,706,575 B2 | 7/2017 | Mawlawi et al. | |
| 2008/0069079 A1 | 3/2008 | Jacobs | |
| 2008/0123558 A1* | 5/2008 | Chhabra | H04L 29/12311 370/254 |
| 2010/0135264 A1 | 6/2010 | Nilsson | |
| 2011/0182171 A1 | 7/2011 | McNew et al. | |
| 2012/0163216 A1 | 6/2012 | Park et al. | |
| 2013/0121303 A1* | 5/2013 | Cho | H04W 74/0833 370/329 |
| 2013/0148501 A1* | 6/2013 | He | H04W 74/085 370/235 |
| 2013/0223419 A1* | 8/2013 | Ghosh | H04W 52/0235 370/338 |
| 2014/0064301 A1 | 3/2014 | Rison | |
| 2015/0257174 A1 | 9/2015 | Liu | |
| 2016/0212768 A1 | 7/2016 | Wentink | |
| 2016/0366702 A1 | 12/2016 | Baba et al. | |

OTHER PUBLICATIONS

Ghazvini et al., (A game theory based contention window adjustment for IEEE 802.11 . . . published on Aug. 2, 2013, and herein after Ghazvini).*

Alcatel-Lucent Shanghai Bell., et al., "Considerations on LBT Enhancements for Licensed-Assisted Access", 3GPP Draft; R1-144083, 3rd Generation Partnership Project (3GPP), Mobile Competence Centre ; 650, Route Des Lucioles ; F-06921 SophiaAntipolis Cedex ; France vol. RAN WGI, No. Ljubljana, Slovenia; Aug. 6, 2014-Aug. 10, 2014 Oct. 5, 2014 (Oct. 5, 2014), XP050895043, 6 Pages. Retrieved from the Internet: URL: http://www.3gpp.org/ftp/Meetings_3GPP_SYNC/RAN1/Docs/ [retrieved on Oct. 5, 2014].

Babaei A., et al., "Overview of EU LBT and its Effectiveness for Coexistence of LAA LTE and Wi-Fi", doc: IEEE 802.19-14/0082r0, Nov. 4, 2014 (Nov. 4, 2014), XP055259389, 11 Pages. Retrieved from the Internet: URL: https://mentor.ieee.org/802.19/dcn/14/19-14-0082-00-0CUB-overview-of-eu-lbt-and-itseffectiveness-for-coexistence-of-laa-lte-and-wi-fi.pptx [retrieved on Mar. 17, 2016].

Ghazvini M., et al., "A Game Theory based Contention Window Adjustment for IEEE 802.11 under Heavy Load", International Journal of Communication Networks and Information Security, XP055259403, Aug. 2, 2013 (Aug. 8, 2013), vol. 5, No. 5, pp. 93-103. Retrieved from the Internet: URL: www.ijcnis.org/index.php/ijcnis/article/download/293/116 [retrieved on Mar. 17, 2016].

International Search Report and Written Opinion—PCT/US2016/013425—ISA/EPO—dated Apr. 4, 2016.

Zhao L., et al., "Using Incompletely Cooperative Game Theory in Wireless Mesh Networks," IEEE Network, IEEE Service Center, New York, NY, US, vol. 21, No. 1, Jan. 21, 2008 (Jan. 21, 2008), pp. 39-44, XP011200366, ISSN: 0890-8044.

* cited by examiner

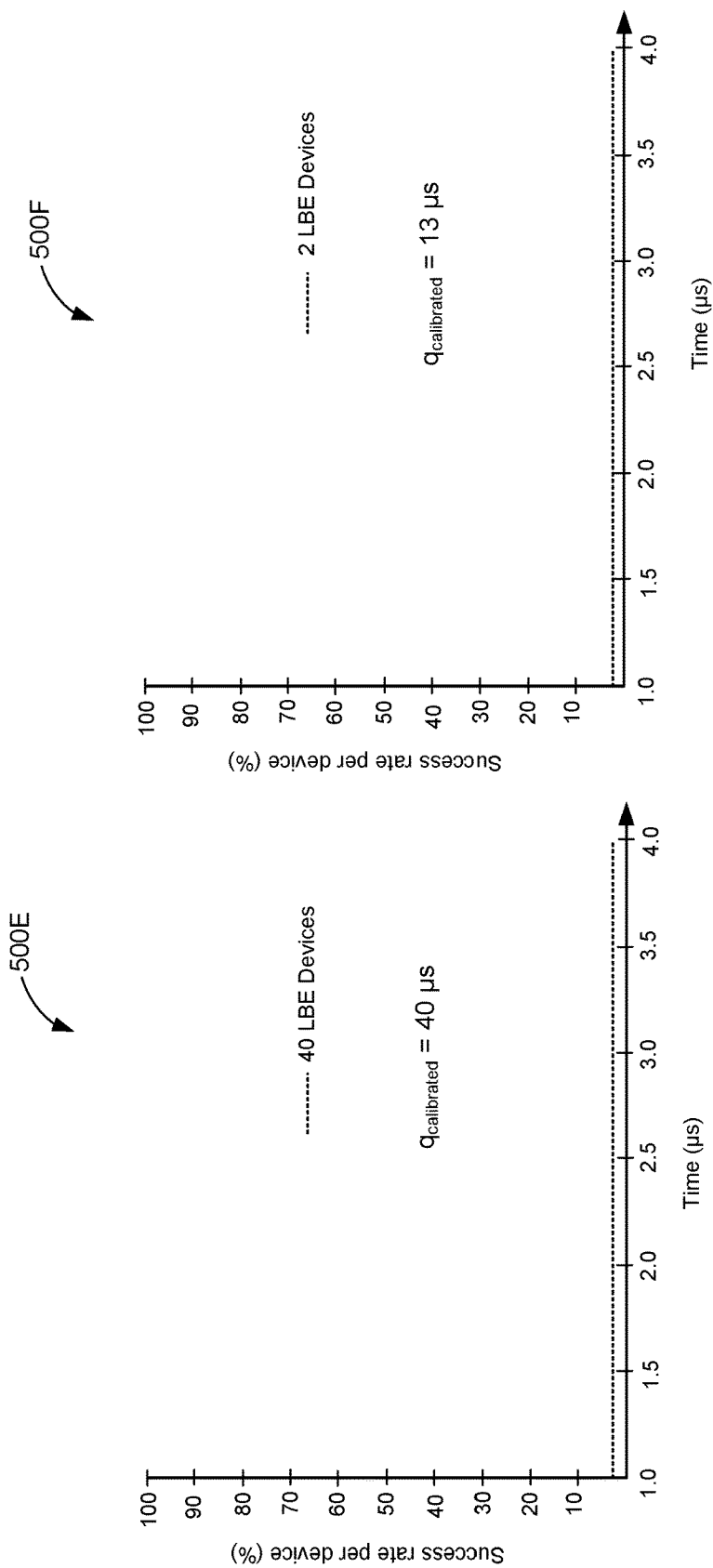

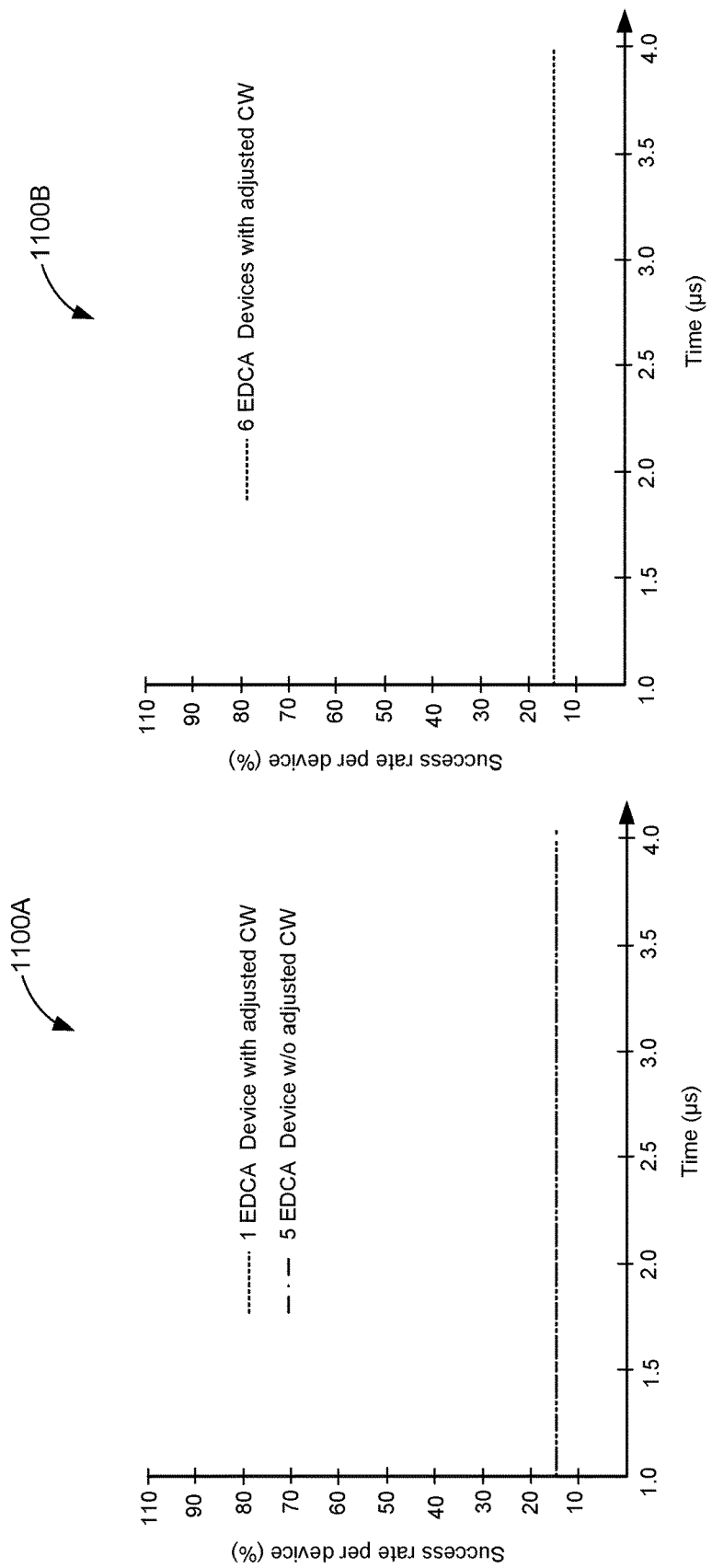

1300 increase the selected contention window size based on an increasing number of wireless devices actively contending for medium access. (1302)

decrease the selected contention window size based on a decreasing number of wireless devices actively contending for medium access. (1304)

FIG. 13A

1310 determine a probability of collisions resulting from a plurality of the first wireless devices simultaneously contending for medium access. (1312)

double the contention window size based on the probability. (1314)

reset the contention window size to a minimum value based on the probability. (1316)

FIG. 13B

WI-FI COMPATIBLE CHANNEL ACCESS

CROSS-REFERENCE TO RELATED APPLICATIONS

This application claims priority to U.S. Provisional Patent Application No. 62/104,001, titled "Wi-Fi Compatible Channel Access," filed Jan. 15, 2015, to U.S. Provisional Patent Application No. 62/183,619, titled "Wi-Fi Compatible Channel Access," filed Jun. 23, 2015, to U.S. Provisional Patent Application No. 62/184,043, titled "Wi-Fi Compatible Channel Access," filed Jun. 24, 2015, to U.S. Provisional Patent Application No. 62/203,278, titled "Wi-Fi Compatible Channel Access," filed Aug. 10, 2015, to U.S. Provisional Patent Application No. 62/215,494, titled "Wi-Fi Compatible Channel Access," filed Sep. 8, 2015, to U.S. Provisional Patent Application No. 62/239,450, titled "Wi-Fi Compatible Channel Access," filed Oct. 9, 2015, and to U.S. Provisional Patent Application No. 62/252,947, titled "Wi-Fi Compatible Channel Access," filed Nov. 9, 2015, the entireties of all of which are hereby incorporated by reference.

TECHNICAL FIELD

The example embodiments relate generally to wireless networks, and specifically to channel access operations between wireless devices.

BACKGROUND OF RELATED ART

A Wi-Fi network may be formed by one or more access points (APs) that provide a wireless communication channel or link with a number of client devices or stations (STAs). Each AP, which may correspond to a Basic Service Set (BSS), periodically broadcasts beacon frames to enable any STAs within wireless range of the AP to establish and/or maintain a communication link with the Wi-Fi network. The beacon frames, which may include a traffic indication map (TIM) indicating whether the AP has queued downlink data for the STAs, are typically broadcast according to a target beacon transmission time (TBTT) schedule.

In a typical Wi-Fi network, only one device may use a shared wireless medium at any given time. To arbitrate access to the shared wireless medium, the IEEE 802.11 standards define a distributed coordination function (DCF) that instructs individual STAs (and APs) to "listen" to the medium to determine when the medium is idle (e.g., using a "carrier sense" technique). When a STA detects that the wireless medium has been continuously idle for a DCF Interframe Space (DIFS) duration, the STA may attempt to transmit data on the wireless medium. Many Wi-Fi networks operating in the 5 GHz frequency band employ an Enhanced Distributed Channel Access (EDCA) mechanism for medium access contention operations. The EDCA mechanism is an example of a listen-before-talk (LBT) protocol.

For example, to prevent multiple devices from accessing the wireless medium at the same time, each device may select a random "back-off" number or period. At the end of the DIFS duration, a contention period begins during which each device waits for a period of time determined by its back-off number (e.g., its back-off period) before it attempts to transmit data on the wireless medium. The device that selects the lowest back-off number will have the shortest back-off period (e.g., the earliest slot time in the contention period), and therefore "wins" the medium access contention operation. If multiple devices select the same back-off value and then attempt to transmit data at the same time, a collision occurs and the devices contend for medium access again using an exponential back-off procedure in which each device doubles the value of its back-off number for each subsequent medium access contention operation.

Other wireless networks may operate on the 5 GHz frequency band, and thus may share the same wireless medium with an IEEE 802.11-compliant wireless network. These other wireless networks may not employ an exponential back-off procedure for collision avoidance, and therefore devices associated with these other wireless networks may have an advantage over devices associated with EDCA-based wireless networks when contending for medium access. For example, channel access mechanisms associated with the European Telecommunications Standards Institute (ETSI) Broadband Access Network (BRAN) for Load Based Equipment (LBE) may not employ exponential back-off procedures for collision avoidance, which in turn may give wireless devices operating according to LBE protocols an unfair advantage over wireless devices that employ EDCA mechanisms for collision avoidance.

Thus, would be desirable for LBE-based devices and EDCA-based devices to more fairly contend for access to a shared wireless medium.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Apparatuses and methods are disclosed that may ensure equal medium access between a first wireless device associated with a load based equipment (LBE) protocol and a number of second wireless devices associated with an enhanced distributed channel access (EDCA) protocol. The LBE protocol may be defined by a European Telecommunications Standards Institute (ETSI) Broadband Access Network (BRAN) for LBE standard, and the EDCA protocol may be defined by an IEEE 802.11 standard.

In one example, a method of ensuring equal medium access between the first wireless device and the number of second wireless devices includes determining a level of contention associated with gaining access to a wireless medium, selecting a contention window size based, at least in part, on the determined level of contention, and selecting, for a medium access contention operation, a random back-off number from a range of numbers defined by the selected contention window size.

In another example, a first wireless device associated with the LBE protocol is disclosed and is configured to ensure equal medium access with a number of second wireless devices associated with the EDCA protocol. The first wireless device may include one or more processors and a memory configured to store instructions. Execution of the instructions by the one or more processors may cause the first wireless device to determine a level of contention associated with gaining access to a wireless medium, to select a contention window size based, at least in part, on the determined level of contention, and to select, for a medium access contention operation, a random back-off number from a range of numbers defined by the selected contention window size.

In another example, a non-transitory computer-readable storage medium is disclosed. The non-transitory computer-readable storage medium may store one or more programs containing instructions that, when executed by one or more processors of a first wireless device associated with the LBE protocol, causes the first wireless device to ensure equal medium access with a number of second wireless devices associated with the EDCA protocol by performing a number of operations. The number of operations may include determining a level of contention associated with gaining access to a wireless medium, selecting a contention window size based, at least in part, on the determined level of contention, and selecting, for a medium access contention operation, a random back-off number from a range of numbers defined by the selected contention window size.

In another example, a first wireless device associated with the LBE protocol is disclosed and is configured to ensure equal medium access with a number of second wireless devices associated with the EDCA protocol. The first wireless device may include means for determining a level of contention associated with gaining access to a wireless medium, means for selecting a contention window size based, at least in part, on the determined level of contention, and means for selecting, for a medium access contention operation, a random back-off number from a range of numbers defined by the selected contention window size.

BRIEF DESCRIPTION OF THE DRAWINGS

The example embodiments are illustrated by way of example and are not intended to be limited by the figures of the accompanying drawings. Like numbers reference like elements throughout the drawings and specification.

FIGS. 5A-5F depict example medium access success rates for LBE devices that adjust their contention window sizes based on the graph of FIG. 4 and example medium access success rates for EDCA devices, in accordance with example embodiments.

FIGS. 11A-11G depict example medium access success rates for EDCA devices that adjust their contention window sizes based on the graph of FIG. 10, in accordance with example embodiments.

FIG. 13A shows an illustrative flowchart depicting an example operation for dynamically adjusting a selected contention window size in accordance with some embodiments.

FIG. 13B shows an illustrative flowchart depicting an example operation for dynamically adjusting a selected contention window size in accordance with other embodiments.

DETAILED DESCRIPTION

Figure 1:
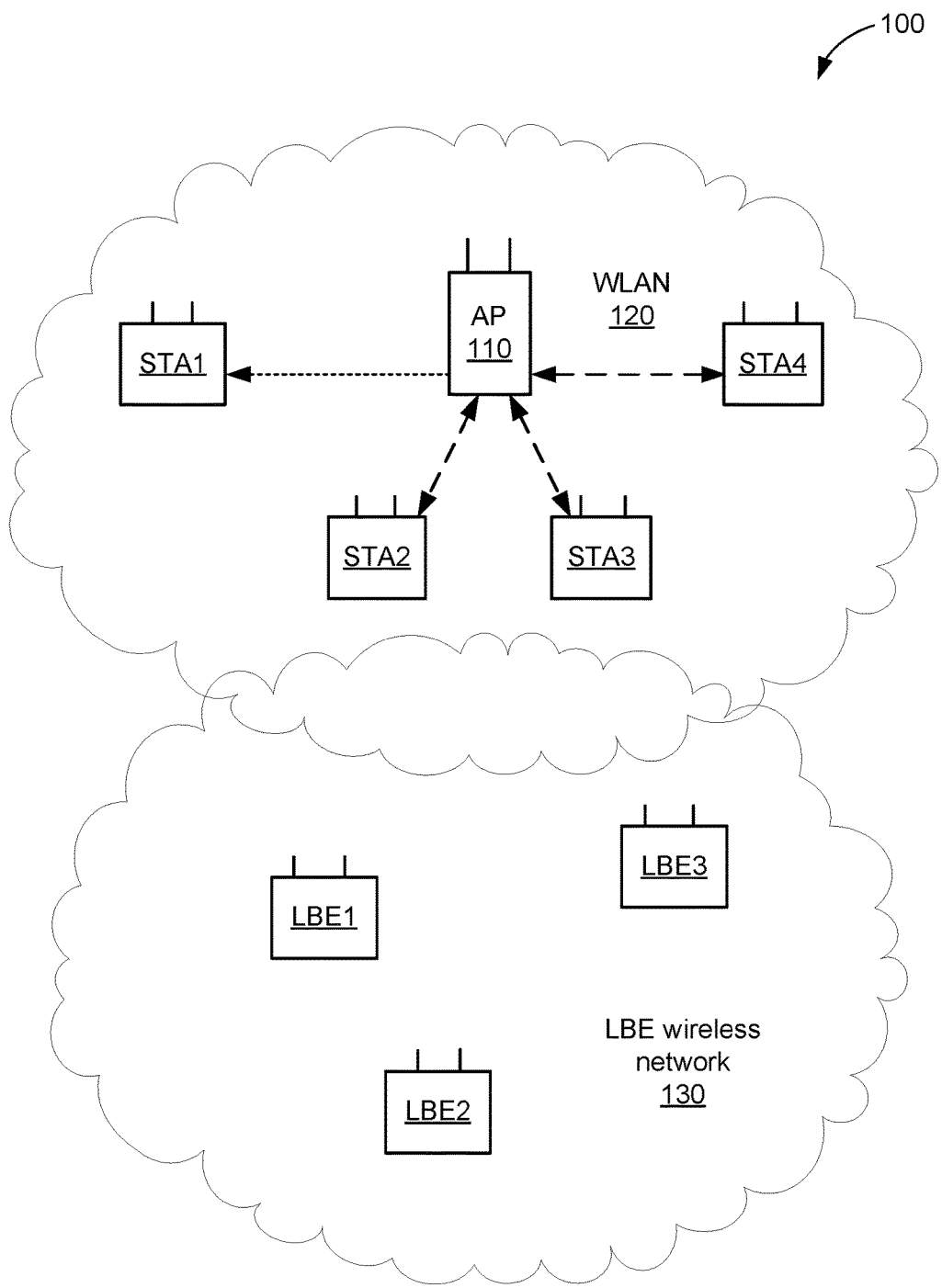
FIG. 1 shows an example wireless system within which the example embodiments may be implemented.

The example embodiments are described below in the context of a wireless system including a wireless local area network (WLAN) and an LBE wireless network for simplicity only. It is to be understood that the example embodiments are equally applicable to other wireless networks (e.g., cellular networks, pico networks, femto networks, satellite networks). As used herein, the terms "WLAN" and "Wi-Fi®" may include communications governed by the IEEE 802.11 family of standards, Bluetooth, HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, although described below in terms of an infrastructure WLAN system including one or more APs and a number of STAs, the example embodiments are equally applicable to other WLAN systems including, for example, multiple WLANs, peer-to-peer (or Independent Basic Service Set) systems, Wi-Fi Direct systems, and/or Hotspots. In addition, although described herein in terms of exchanging data frames between wireless devices, the example embodiments may be applied to the exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

In the following description, numerous specific details are set forth such as examples of specific components, circuits, and processes to provide a thorough understanding of the present disclosure. The term "coupled" as used herein means connected directly to or connected through one or more intervening components or circuits. The term "medium access" as used herein may refer to gaining and/or controlling access to a shared wireless medium. The term "transmit opportunity" (TXOP) as used herein may refer to a period of time during which a device (or a portion of the device) may transmit data via the shared wireless medium. As used herein, the term "EDCA device" may refer to a wireless device that employs an exponential back-off procedure for collision avoidance, for example, in accordance with the EDCA mechanisms defined in the IEEE 802.11e standards. Further, as used herein, the term "LBE device" may refer to a wireless device that does not employ an exponential back-off procedure for collision avoidance, for example, such as wireless devices operating in accordance with the LBE standards provided by the ETSI. It is noted that channel access mechanisms associated with the ETSI's Broadband Access Network (BRAN) for LBE may also be referred to as LBT for LBE, and thus the terms "LBE device" and "LBT for LBE device" may be used interchangeably herein.

Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scopes all embodiments defined by the appended claims.

As mentioned above, to prevent multiple devices from accessing a shared wireless medium at the same time, the IEEE 802.11 standards define a distributed coordination function (DCF) that instructs individual devices to determine that the shared wireless medium has been idle for a time period before attempting to transmit data. Specifically, after the shared wireless medium has been idle for a DIFS duration, a contention period begins during which each device waits for a period of time determined by its randomly selected back-off number before it attempts to transmit data on the wireless medium. The device that selects the lowest back-off number has the shortest back-off period, and therefore "wins" access to the shared wireless medium. The winning device may be granted access to the shared wireless medium for a period of time commonly referred to as the transmit opportunity (TXOP).

Data may be selected for transmission over the shared medium according to priority levels, for example, so that higher priority data (e.g., voice data) may be allocated higher transmission priorities than lower priority data (e.g., emails). More specifically, data of different priority levels may be assigned different ranges of back-off numbers so that higher priority data is more likely to win a given medium access contention operation than lower priority data (e.g., by assigning lower back-off numbers to higher priority data and assigning higher back-off numbers to lower priority data). The different ranges of back-off numbers may be allocated to different priority levels of data by classifying data into access categories, and then providing a different range of back-off numbers to each access category (AC).

According to the enhanced distributed coordination channel access (EDCA) function described in the IEEE 802.11e standards, each STA is to include a different transmit queue for each access category (AC), and the transmit queues are to independently contend for medium access. Because an AP may serve multiple STAs at the same time, the AP may include a plurality of transmit queues for each AC. More specifically, the AP may classify downlink data (e.g., data to be transmitted to one or more of its associated STAs) based on a traffic identifier (TID) and a destination address (DA). The destination address (DA) indicates to which STA the data is to be transmitted. The TID indicates the priority level of the data, and may thus be mapped to a corresponding access category. By classifying downlink data according to its TID and DA, the AP may aggregate data of the same priority level in a common set of AC queues that select from a corresponding range of back-off numbers. The aggregated data may be transmitted over the wireless medium as aggregated data frames such as, for example, aggregate MAC protocol data units (AMPDUs) and/or aggregate MAC service data units (AMSDUs).

As mentioned above, each device contending for medium access may select (e.g., generate) a random back-off number that may correspond to one of the slot times of the contention period. More specifically, each device may initially set its contention window (CW) to a minimum value ($CW_{min}$), and then randomly selects its back-off number from a range of numbers between 0 and the CW value. After the wireless medium has been idle for a DIFS duration, each device may decrement its selected back-off number after each Arbitration Interframe Space (AIFS) duration. The AIFS duration may be based on the AIFS number (AIFSN), the slot time (ST), and a Short Interframe Space (SIFS) duration. The AIFSN may be based on the access category to which the transmit data is assigned. In general, the AIFS duration may be expressed as AIFS=AIFSN[AC]*ST+SIFS, where AIFSN[AC] is the AIFS number for the access category of the transmit data. For Wi-Fi networks operating in the 5 GHz frequency band (e.g., in accordance with the IEEE 802.11n/ac protocols), each slot time has a duration of 9 μs, the SIFS duration is 18 μs, and the DIFS duration is 34 μs.

If multiple devices select the same back-off number and attempt to transmit data at the same time, a collision occurs and the devices contend for medium access again using an exponential back-off procedure in which each device doubles the contention window for each subsequent medium access contention operation. When the contention window reaches a maximum value ($CW_{max}$), the contention window size remains at $CW_{max}$ until one of the contending devices wins access to the shared wireless medium.

In contrast to the EDCA mechanisms defined in the IEEE 802.11e standards, LBE devices employ a contention window of a fixed size, commonly denoted as q, upon which to base selection of their back-off numbers. The value of q, which is an integer greater than or equal to one, may be based on the maximum duration of a transmission from an LBE device. For example, when the wireless medium has been idle for more than a time period, an LBE device may select a random back-off number between zero and the value of q, and may then decrement its back-off number after each slot time. The LBE device may transmit data on the wireless medium when its back-off number reaches zero if the LBE device does not sense a busy condition on the shared wireless medium. The slot time for LBE device is currently set at 20 μs.

Because EDCA devices double their contention window sizes after each occurrence of a collision and LBE devices maintain the same contention window size regardless of collisions, LBE devices may have an advantage in contending for medium access in the event of collisions, especially if the collisions result in multiple medium access contention operations. As the number of devices contending for medium access increases (e.g., which increases the probability of collisions), LBE devices tend to have a higher-priority access to the shared wireless medium than EDCA devices. As explained in more detail below, the example embodiments disclose apparatuses and methods to ensure fair access to a wireless medium shared between LBE devices and EDCA devices.

FIG. 1 is a block diagram of a wireless system 100 within which the example embodiments may be implemented. The wireless system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 is assigned a unique MAC address that is programmed therein by, for example, the manufacturer of the access point. Similarly, each of stations STA1-STA4 is also assigned a unique MAC address. For some embodiments, the wireless system 100 may correspond to a multiple-input multiple-output (MIMO) wireless network. Further, although the WLAN 120 is depicted in FIG. 1 as an infrastructure BSS, for other example embodiments, WLAN 120 may be an IBSS, an ad-hoc network, or a peer-to-peer (P2P) network (e.g., operating according to the Wi-Fi Direct protocols).

Each of stations STA1-STA4 may be any suitable Wi-Fi enabled wireless device including, for example, a cell phone, personal digital assistant (PDA), tablet device, laptop computer, or the like. Each station STA may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each station STA may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 12 and 13A-13B.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that may store instructions for performing operations described below.

For the stations STA1-STA4 and/or AP 110, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band and/or within a 5 GHz frequency band in accordance with the IEEE 802.11 specification. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within the STA may be any technically feasible transceiver such as a ZigBee transceiver described by a specification from the ZigBee specification, a WiGig transceiver, and/or a HomePlug transceiver described a specification from the HomePlug Alliance.

The wireless system 100 may also include, be adjacent to, or otherwise be associated with an LBE wireless network 130. The LBE wireless network 130 is depicted in FIG. 1 as including three LBE devices LBE1-LBE3. For other embodiments, the LBE wireless network 130 may include any suitable number of LBE devices and/or any suitable number of APs. Each of LBE devices LBE1-LBE3 may be any suitable wireless device including, for example, a cell phone, personal digital assistant (PDA), tablet device, laptop computer, or the like. Each station STA may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each LBE device may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 9.

For purposes of discussion herein, the WLAN 120 and the LBE wireless network 130 may operate on the same or similar frequency bands (e.g., the 5 GHz frequency band), and thus the stations STA1-STA4 of WLAN 120 and the LBE devices LBE1-LBE3 of the LBE wireless network 130 may contend with each other for access to a shared wireless medium, as described in more detail below.

Figure 2:
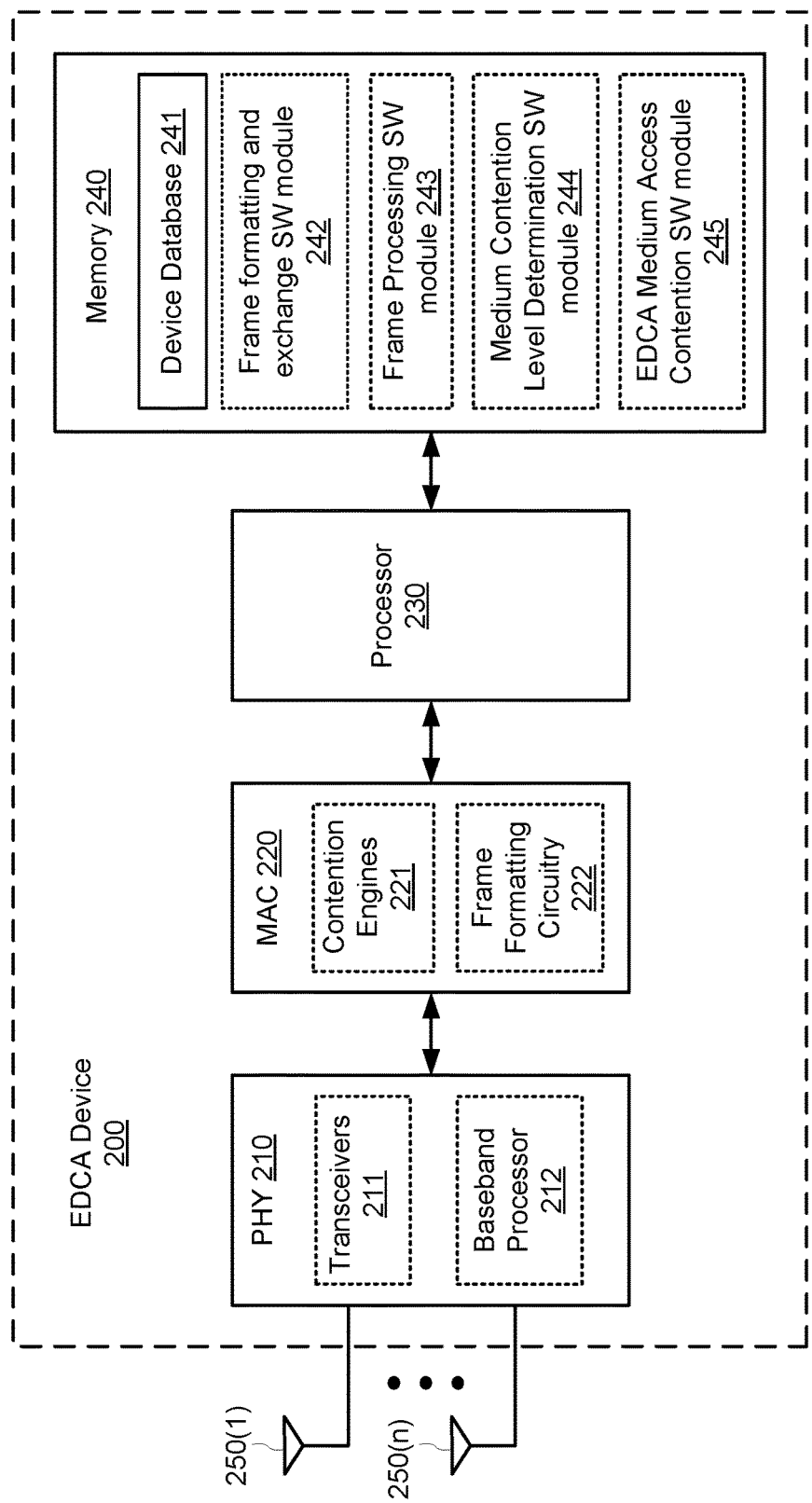
FIG. 2 shows an example EDCA device in accordance with example embodiments.

FIG. 2 shows an example EDCA device 200 that may be one embodiment of one or more of stations STA1-STA4 of FIG. 1. The EDCA device 200 may include a PHY device 210 including at least a number of transceivers 211 and a baseband processor 212, may include a MAC 220 including at least a number of contention engines 221 and frame formatting circuitry 222, may include a processor 230, may include a memory 240, and may include a number of antennas 250(1)-250(n). The transceivers 211 may be coupled to antennas 250(1)-250(n), either directly or through an antenna selection circuit (not shown for simplicity). The transceivers 211 may be used to transmit signals to and receive signals from AP 110 and/or other STAs (see also FIG. 1), and may be used to scan the surrounding environment to detect and identify nearby access points and/or other STAs (e.g., within wireless range of EDCA device 200). Although not shown in FIG. 2 for simplicity, the transceivers 211 may include any number of transmit chains to process and transmit signals to other wireless devices via antennas 250(1)-250(n), and may include any number of receive chains to process signals received from antennas 250(1)-250(n). Thus, for example embodiments, the EDCA device 200 may be configured for MIMO operations. The MIMO operations may include single-user MIMO (SU-MIMO) operations and multi-user MIMO (MU-MIMO) operations.

The baseband processor 212 may be used to process signals received from processor 230 and/or memory 240, and to forward the processed signals to transceivers 211 for transmission via one or more of antennas 250(1)-250(n). The baseband processor 212 may also be used to process signals received from one or more of antennas 250(1)-250(n) via transceivers 211, and to forward the processed signals to processor 230 and/or memory 240.

For purposes of discussion herein, MAC 220 is shown in FIG. 2 as being coupled between PHY device 210 and processor 230. For actual embodiments, PHY device 210, MAC 220, processor 230, and/or memory 240 may be connected together using one or more buses (not shown for simplicity).

The contention engines 221 may contend for access to one more shared wireless mediums, and may also store packets for transmission over the one more shared wireless mediums. The EDCA device 200 may include one or more contention engines 221 for each of a plurality of different access categories. For other embodiments, the contention engines 221 may be separate from MAC 220. For still other embodiments, the contention engines 221 may be implemented as one or more software modules (e.g., stored in memory 240 or stored in memory provided within MAC 220) containing instructions that, when executed by processor 230, perform the functions of contention engines 221.

The frame formatting circuitry 222 may be used to create and/or format frames received from processor 230 and/or memory 240 (e.g., by adding MAC headers to PDUs provided by processor 230), and may be used to re-format frames received from PHY device 210 (e.g., by stripping MAC headers from frames received from PHY device 210).

Memory 240 may include a device database 241 that stores device profiles for a plurality of other wireless devices such as, for example, APs, other EDCA devices (or other STAs), and/or LBE devices. Each device profile may include information including, for example, the corresponding device's Service Set Identification (SSID), MAC address, channel information, RSSI values, goodput values, channel state information (CSI), supported data rates, connection history with the EDCA device 200, and any other suitable information pertaining to or describing the operation of the corresponding device.

Figure 12:
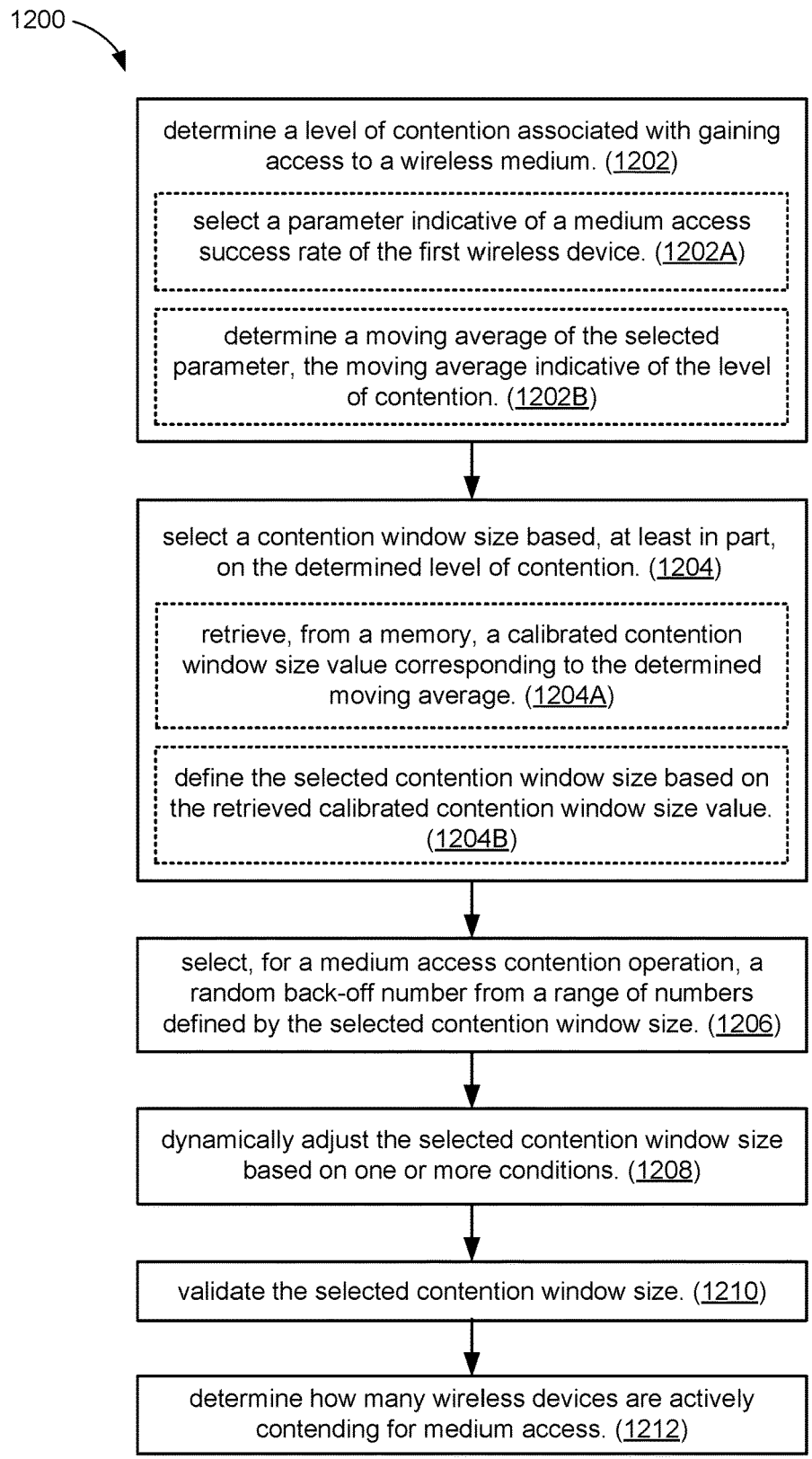
FIG. 12 shows an illustrative flowchart depicting an example operation for selecting contention window sizes for EDCA devices, in accordance with example embodiments.

Memory 240 may also include a non-transitory computer-readable medium (e.g., one or more nonvolatile memory elements, such as EPROM, EEPROM, Flash memory, a hard drive, and so on) that may store at least the following software (SW) modules:
 a frame formatting and exchange software module 242 to facilitate the creation and exchange of any suitable frames (e.g., data frames, control frames, management frames, and/or action frames) between EDCA device 200 and other wireless devices (e.g., as described for one or more operations of FIGS. 12 and 13A-13B);
 a frame processing SW module 243 to process received frames or packets (e.g., as described for one or more operations of FIGS. 12 and 13A-13B);
 a medium contention level determination SW module 244 to determine a level of contention associated with gaining access to a wireless medium (e.g., as described for one or more operations of FIGS. 12 and 13A-13B); and
 an EDCA medium access contention SW module 245 to select a contention window size, to select a random back-off number from a range of numbers defined by the selected contention window size, to count down the random back-off number, to dynamically adjust the selected contention window size, and/or to facilitate other operations associated with contending for medium access (e.g., as described for one or more operations of FIGS. 12 and 13A-13B).

Each software module includes instructions that, when executed by processor 230, cause EDCA device 200 to perform the corresponding functions. The non-transitory computer-readable medium of memory 240 thus includes instructions for performing all or a portion of the operations depicted in FIGS. 12 and 13A-13B.

Processor 230 may be any suitable one or more processors capable of executing scripts or instructions of one or more software programs stored in EDCA device 200 (e.g., within memory 240). For example, processor 230 may execute the frame formatting and exchange software module 242 to facilitate the creation and exchange of any suitable frames (e.g., data frames, control frames, management frames, and/or action frames) between EDCA device 200 and other wireless devices. Processor 230 may execute the frame processing SW module 243 to process received frames or packets. Processor 230 may execute the medium contention level determination SW module 244 to determine a level of contention associated with gaining access to a wireless medium. Processor 230 may execute the EDCA medium access contention SW module 245 to select a contention window size, to select a random back-off number from a range of numbers defined by the selected contention window size, to count down the random back-off number, to dynamically adjust the selected contention window size, and/or to facilitate other operations associated with contending for medium access for EDCA device 200.

Figure 3:
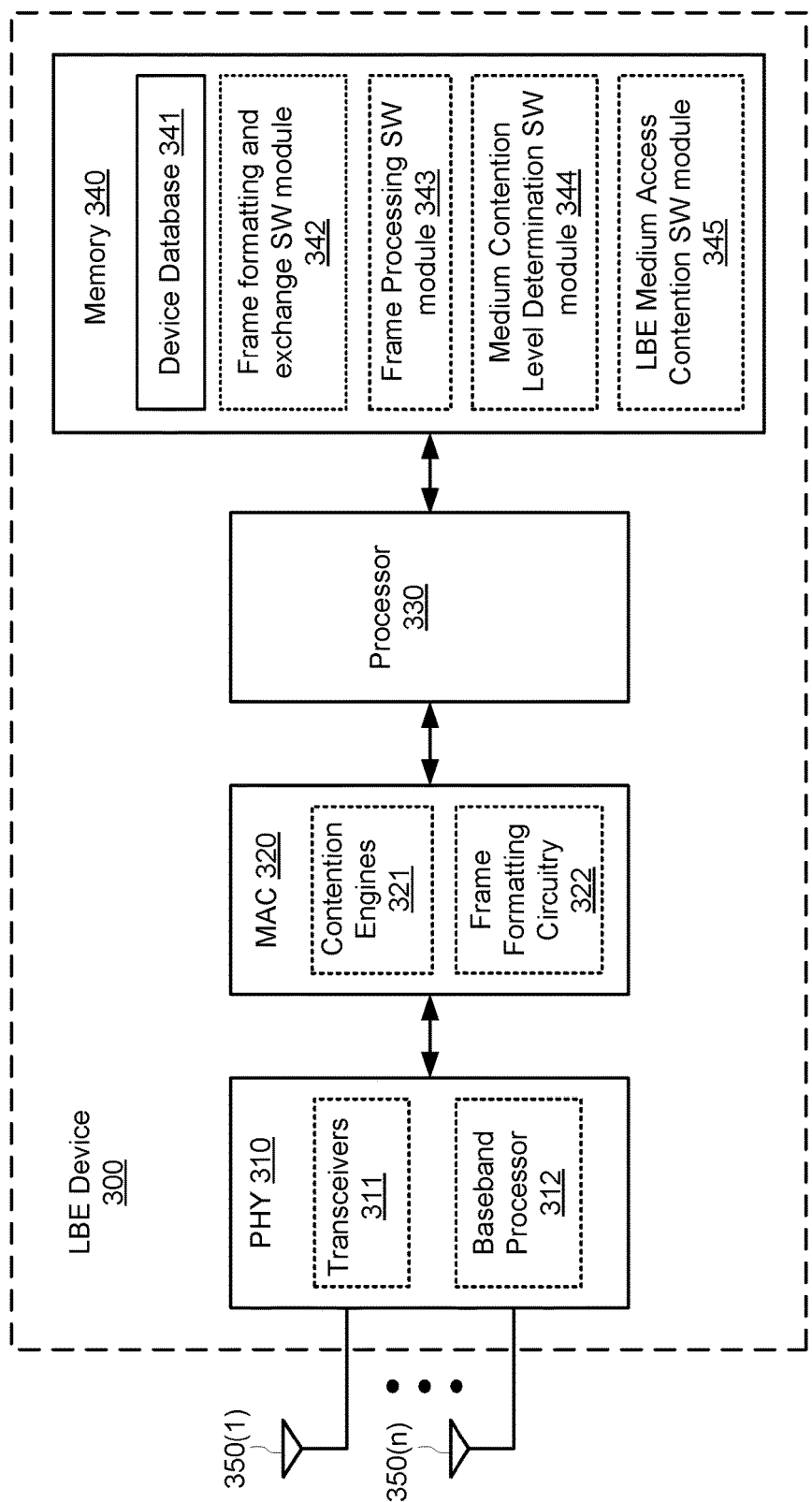
FIG. 3 shows an example LBE device in accordance with example embodiments.

FIG. 3 shows an example LBE device 300 that may be one embodiment of one or more of LBE devices LBE1-LBE3 of FIG. 1. The LBE device 300 may include a PHY device 310 including at least a number of transceivers 311 and a baseband processor 312, may include a MAC 320 including at least a number of contention engines 321 and frame formatting circuitry 322, may include a processor 330, may include a memory 340, and may include a number of antennas 350(1)-350(n). Operations of the PHY device 310, MAC 320, and antennas 350(1)-350(n) of LBE device 300 are similar to operations of PHY device 210, MAC 220, and antennas 250(1)-250(n) of EDCA device 200 described above with respect to FIG. 2, and are therefore not repeated herein for brevity.

Memory 340 may include a device database 341 that stores device profiles for a plurality of other wireless devices such as, for example, APs, other LBE devices, and/or EDCA devices. Each device profile may include information including, for example, the corresponding device's Service Set Identification (SSID), MAC address, channel information, RSSI values, goodput values, channel state information (CSI), supported data rates, connection history with the LBE device 300, and any other suitable information pertaining to or describing the operation of the corresponding device.

Figure 9:
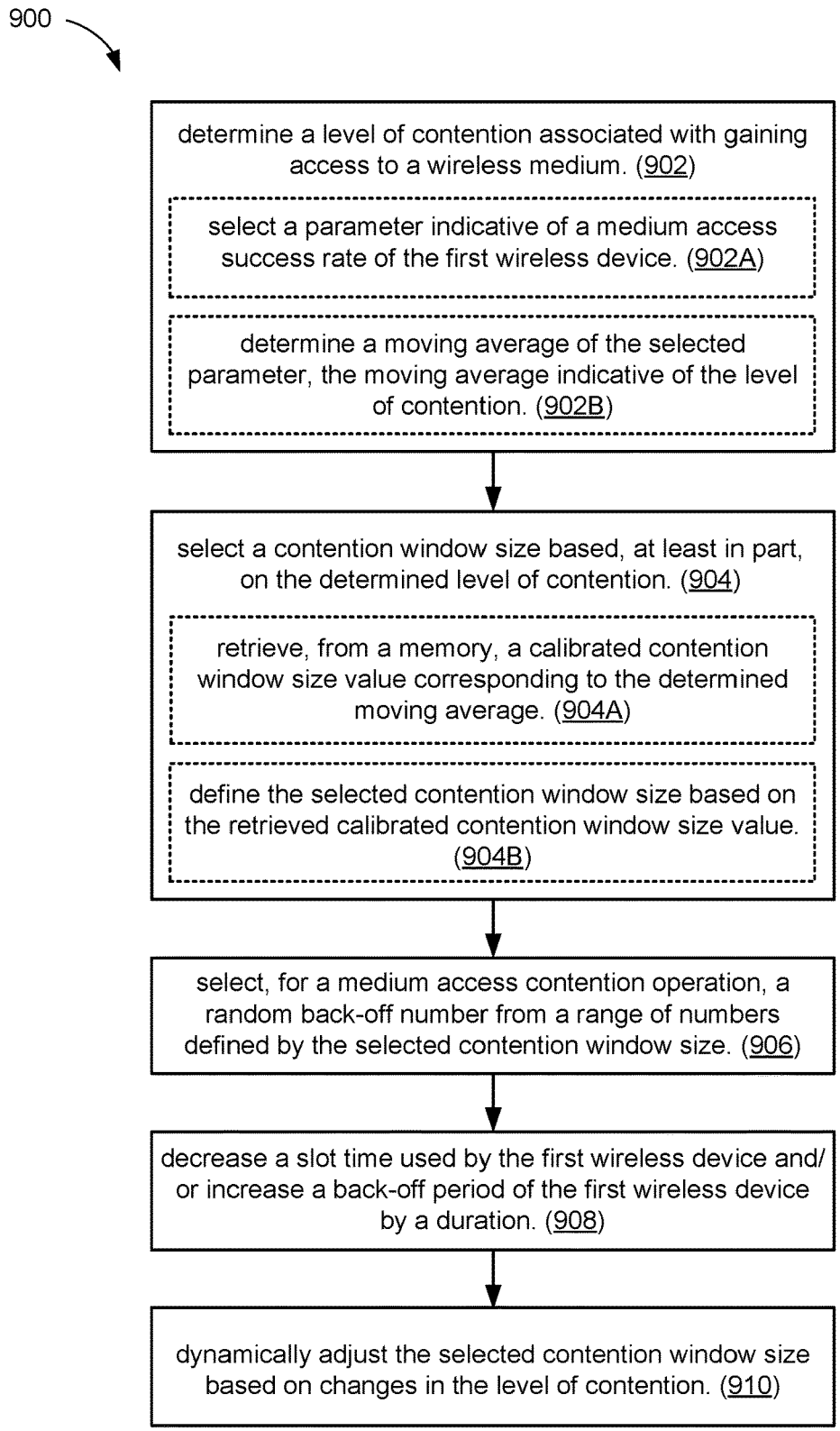
FIG. 9 shows an illustrative flowchart depicting an example operation for selecting contention window sizes for LBE devices, in accordance with example embodiments.

Memory 340 may also include a non-transitory computer-readable medium (e.g., one or more nonvolatile memory elements, such as EPROM, EEPROM, Flash memory, a hard drive, and so on) that may store at least the following software (SW) modules:

- a frame formatting and exchange software module 342 to facilitate the creation and exchange of any suitable frames (e.g., data frames, control frames, management frames, and/or action frames) between LBE device 300 and other wireless devices (e.g., as described for one or more operations of FIG. 9);
- a frame processing SW module 343 to process received frames or packets (e.g., as described for one or more operations of FIG. 9);
- a medium contention level determination SW module 344 to determine a level of contention associated with gaining access to a wireless medium (e.g., as described for one or more operations of FIG. 9); and
- an LBE medium access contention SW module 345 to select a contention window size, to select a random back-off number from a range of numbers defined by the selected contention window size, to count down the random back-off number, to dynamically adjust the selected contention window size, and/or to facilitate other operations associated with contending for medium access (e.g., as described for one or more operations of FIG. 9).

Each software module includes instructions that, when executed by processor 330, cause the LBE device 300 to perform the corresponding functions. The non-transitory computer-readable medium of memory 340 thus includes instructions for performing all or a portion of the operations depicted in FIG. 9.

Processor 330 may be any suitable one or more processors capable of executing scripts or instructions of one or more software programs stored in LBE device 300 (e.g., within memory 340). For example, processor 330 may execute the frame formatting and exchange software module 342 to facilitate the creation and exchange of any suitable frames (e.g., data frames, control frames, management frames, and/or action frames) between LBE device 300 and other wireless devices. Processor 330 may execute the frame processing SW module 343 to process received frames or packets. Processor 330 may execute the medium contention level determination SW module 344 to determine a level of contention associated with gaining access to a wireless medium. Processor 330 may execute the LBE medium access contention SW module 345 to select a contention window size, to select a random back-off number from a range of numbers defined by the selected contention window size, to count down the random back-off number, to dynamically adjust the selected contention window size, and/or to facilitate other operations associated with contending for medium access for LBE device 300.

As discussed above, when contending for medium access, LBE devices may select a random back-off number between zero and the value of q (which as described above denotes the fixed contention window size conventionally associated with LBE devices). The value of q does not typically change, even if there are collisions resulting from medium access contention operations. Because EDCA devices use an exponential back-off procedure for collision avoidance, LBE devices may have an advantage over EDCA devices when contending for medium access, especially when collisions on the shared wireless medium result in additional contention operations between the LBE devices and the EDCA devices. Thus, as described in more detail below, the example embodiments may adjust medium access contention operations for LBE devices and/or EDCA devices in a manner that ensures that LBE devices and EDCA devices have similar success rates in accessing a shared wireless medium.

For example embodiments, disparities in the likelihood of winning medium access between LBE devices and EDCA devices may be reduced by (1) decreasing the duration of the slot time used by LBE devices from 20 μs to 9 μs (or to other suitable time values) and (2) requiring LBE devices to add an AIFS duration to their random back-off numbers in the event of a collision. For example, decreasing the LBE slot time may allow LBE device 300 to begin an initial medium access contention operation sooner than conventional LBE devices, and requiring LBE device 300 to add an AIFS duration to its back-off number in the event of a collision may allow EDCA devices (such as EDCA device 200 of FIG. 2) to have a similar success rate in gaining medium access as the LBE device 300 during subsequent medium access contention operations. In this manner, the back-off periods for LBE device 300 may more closely resemble the back-off periods for EDCA devices such as EDCA device 200.

The size of the contention window (e.g., the value of q) from which LBE device 300 selects random back-off numbers may also be adjusted to ensure that LBE devices and EDCA devices have fair (e.g., equal) access to the shared wireless medium. For example, the LBE device 300 may determine a level of contention associated with gaining access to a wireless medium, may select a contention window size based, at least in part, on the determined level of contention, and may select a random back-off number from a range of numbers defined by the selected contention window size.

More specifically, the contention window size (q) may be adjusted based on observed collisions, transmission interruptions, and/or or inter-CCA (clear channel assessment) busy times in a manner that ensures that LBE devices and EDCA devices have equal chances of gaining medium access. In some aspects, LBE device 300 may maintain a moving average of one or more parameters indicative of a channel access success rate. The one or more "success rate" parameters may include, for example, (i) the average number of interruptions per transmission, (ii) the average collision rate, and (iii) the average time between medium busy events. For some implementations, the moving average (MA) may be determined as a simple (e.g., unweighted) moving average, for example, that may be expressed as:

$$MA = \frac{SRP_0 + SRP_1 + \ldots + SRP_n}{n} \qquad (EQ. 1)$$

where SRP is a selected one of the success rate parameters, and n is an integer indicating the number of SRP values used to determine the moving average.

For other implementations, the moving average MA may be determined as a weighted moving average. For example, in some aspects, the moving average MA may be weighting using a damping factor (DF), and expressed as:

$$MA = (1-DF)*MA + DF*SRP \qquad (EQ. 2)$$

For at least some embodiments, the damping factor DF may be between approximately 0.5% and 10% (although for other embodiments, the damping factor DF may be of other suitable values).

In other aspects, a moderation factor (MF) may be used to adjust the value of q so as to converge to a target q value ($q_{target}$). For example, the q value may be expressed as:

$$q = q + MF*(q_{target} - q) \qquad (EQ. 3)$$

For at least some embodiments, the moderation factor MF may be between approximately 1% and 20% (although for other embodiments, the moderation factor MF may be of other suitable values).

It is noted that although increasing the damping factor value and/or the moderation factor value may increase the speed with which the value of q converges to the value of $q_{target}$, increasing the damping factor value and/or the moderation factor value may also increase signal fluctuations and jitter. Thus, the selection of the damping factor value and/or the moderation factor value may involve a trade-off between (1) the rate at which the value of q is adjusted in response to changing numbers of devices contending for medium access and (2) the rate at which the channel access success rate changes for each of the contending devices. For at least some implementations, the moving average value and the value of q may be updated after each transmission (e.g., after each contention period ends).

The LBE device 300 may select a suitable contention window size based on a relationship between values of q that result in the same (or similar) medium access success rates for LBE devices and EDCA devices and the moving average of a selected success rate parameter. More specifically, for some embodiments, the value of q may be calibrated (e.g., adjusted or otherwise modified from the fixed value defined by the ETSI standards) for each of a plurality of moving average values of the selected success rate parameter, for example, such that the LBE devices and EDCA devices have the same (or similar) medium access success rates. The resulting relationship between the calibrated q values and the moving averages of the selected success rate parameter may be plotted as a graph (which may be referred to herein as a "calibrated q graph"). In some aspects, the calibrated q graph may be stored in the LBE device (e.g., within memory 340 of LBE device 300). Thereafter, when contending for medium access, the LBE device 300 may measure, obtain, or otherwise determine the selected success rate parameter, and then select a corresponding calibrated q value from the calibrated q graph.

Figure 4:
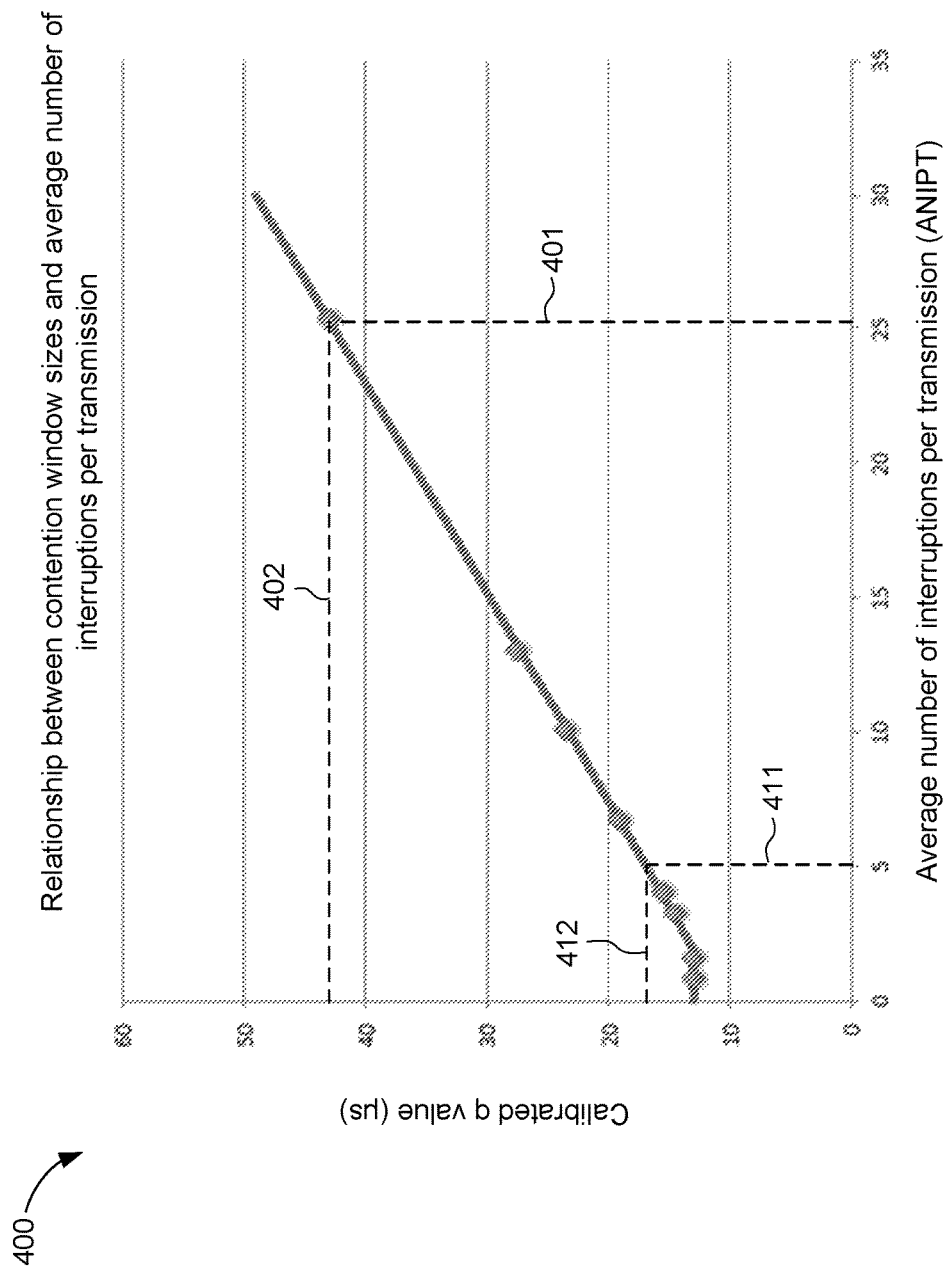
FIG. 4 depicts an example relationship between calibrated contention window sizes for LBE devices and an average number of interruptions per transmission, in accordance with example embodiments.

As mentioned above, for some implementations, the average number of interruptions per transmission (ANIPT) may be the selected success rate parameter. For example, FIG. 4 shows a calibrated q graph 400 depicting an example relationship between calibrated LBE contention window sizes (e.g., calibrated q values) and ANIPT values. As shown in FIG. 4, the calibrated q value increases as the average number of interruptions per transmission increases. More specifically, as the average number of interruptions per transmission increases (e.g., indicating an increasing level of contention on the shared wireless medium), the likelihood of EDCA devices employing an exponential back-off procedure also increases, which as discussed above may put EDCA devices at a disadvantage relative to LBE devices when contending for medium access.

Thus, in accordance with example embodiments, the size of the contention window from which LBE device 300 selects a random back-off number for medium access contention operations may be adjusted (e.g., increased) based on the calibrated q graph 400. As described in more detail below, the LBE device 300 may increase its back-off period based, at least in part, on a selected calibrated q value so that medium access success rates for the LBE device 300 are the same (or at least similar) to the medium access success rate of EDCA devices. For example, in an implementation using the example calibrated q graph 400, if the average number of interruptions per transmission is a relatively high value of approximately 25, then a relatively high calibrated q value of approximately 42 µs may define the contention window size from which LBE device 300 selects its random back-off number for medium access contention operations (as indicated by lines 401-402).

Conversely, as shown in FIG. 4, the calibrated q value decreases as the average number of interruptions per transmission decreases. More specifically, as the average number of interruptions per transmission decreases (e.g., indicating a decreasing level of contention on the shared wireless medium), the likelihood of EDCA devices employing an exponential back-off procedure also decreases, which as discussed above may reduce the differences in medium access success rates between EDCA devices and LBE devices. For example, in an implementation using the example calibrated q graph 400, if the average number of interruptions per transmission is a relatively low value of approximately 5, then a relatively low calibrated q value of approximately 16 µs may define the contention window size from which LBE device 300 selects its random back-off number for medium access contention operations (as indicated by lines 411-412).

The calibrated q graph 400 of FIG. 4 may be determined by observing, for each of a plurality of ANIPT values, the medium access success rates of LBE devices compared to the medium access success rates of EDCA devices. More specifically, the value of q (e.g., the LBE contention window size) may be adjusted until the medium access success rates are the same (or at least similar) for both LBE devices and EDCA devices. The value of q that results in the same or similar medium access success rates for LBE and EDCA devices may be selected as the calibrated q value corresponding to a particular ANIPT value. The calibrated q values may be plotted as a function of the ANIPT values to generate the example calibrated q graph 400 of FIG. 4.

Thereafter, when contending for medium access, the LBE device 300 may measure, obtain, or otherwise determine an ANIPT value, and then select a corresponding calibrated q value from the calibrated q graph 400. The LBE device 300 may then use the selected calibrated q value (rather than the fixed q value) to define the contention window size from which to select a random back-off number for medium access contention operations.

For example, Table 1 below lists a number of example pairs of calibrated q values and ANIPT values from which the example calibrated q graph 400 of FIG. 4 may be determined.

TABLE 1

| Devices | ANIPT | Calibrated q (µs) |
|---------|-------|-------------------|
| 2 | 0.9 | 13 |
| 3 | 1.7 | 13 |
| 5 | 3.3 | 14.5 |
| 6 | 4.1 | 15.5 |
| 10 | 6.8 | 19.0 |
| 15 | 10.1 | 23.5 |
| 20 | 13.1 | 27.5 |
| 40 | 25.3 | 43.0 |

More specifically, for some implementations, the pairs of calibrated q values and ANIPT values shown above in Table 1 may be used to determine a calibrated q value using the below expression (where "max{a, b}" equals the greater of a and b):

$$q_{calibrated} = \max\{13, 10.4766 + 1.2852 * ANIPT\} \quad (EQ. 4)$$

Figures 5A, 5B:
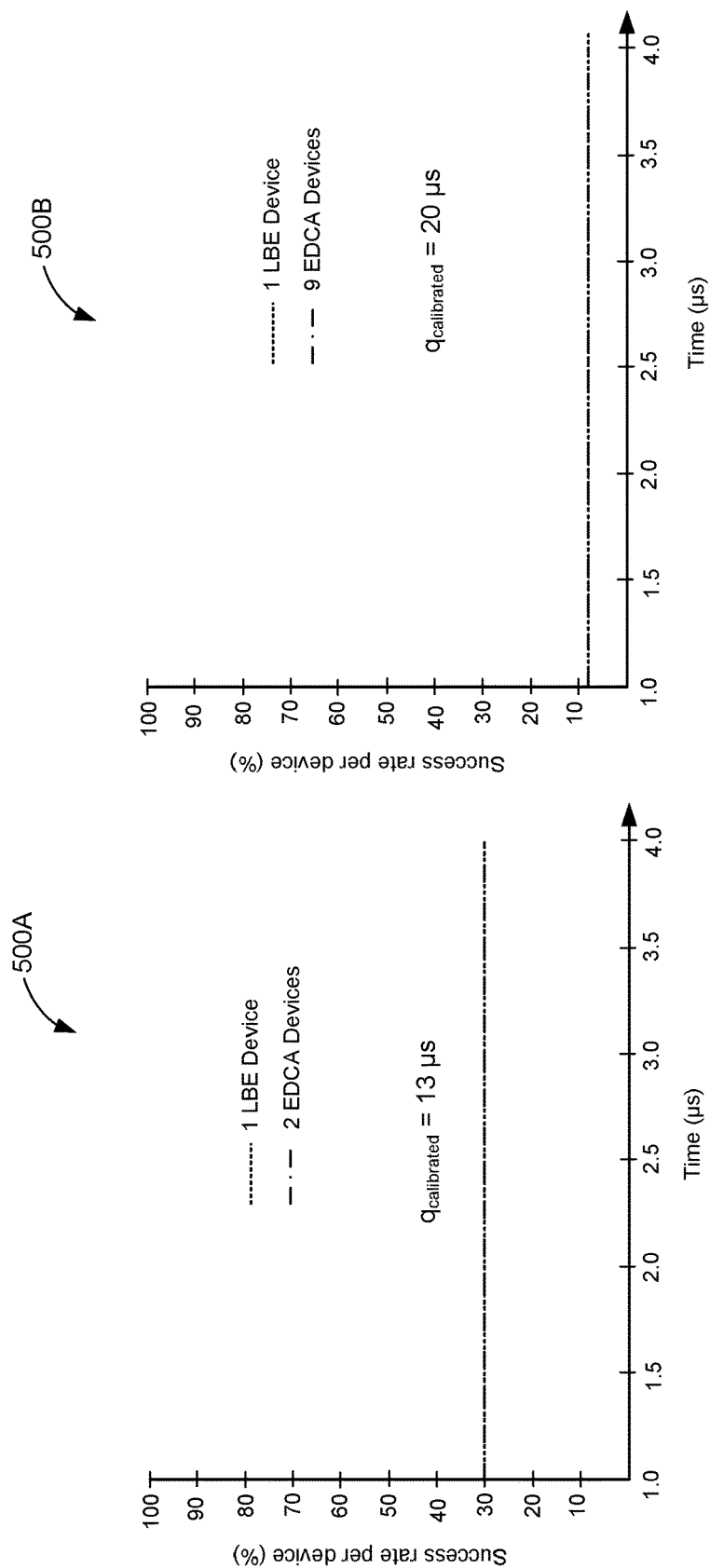

For one example, FIG. 5A shows an example graph 500A depicting example medium access success rates as a function of time for a wireless network including 1 LBE device and 2 EDCA devices contending for medium access. More specifically, the LBE device (not shown for simplicity) contends for medium access using a calibrated q value that may be determined in accordance with example embodiments (e.g., as described above with respect to FIG. 4), and the EDCA devices (not shown for simplicity) contend for medium access using the EDCA back-off mechanism defined in the IEEE 802.11e standards. As depicted in FIG. 5A, the LBE device and the EDCA devices each have a medium access success rate of approximately 30%. The calibrated q value used by the LBE device in the example of FIG. 5A is approximately 13 μs.

For another example, FIG. 5B shows an example graph 500B depicting example medium access success rates as a function of time for a wireless network including 1 LBE device and 9 EDCA devices contending for medium access. More specifically, the LBE device (not shown for simplicity) contends for medium access using a calibrated q value that may be determined in accordance with example embodiments (e.g., as described above with respect to FIG. 4), and the EDCA devices (not shown for simplicity) contend for medium access using the EDCA back-off mechanism defined in the IEEE 802.11e standards. As depicted in FIG. 5B, the LBE device and the EDCA devices each have a medium access success rate of approximately 10%. For the LBE device in the example of FIG. 5B, $q_{calibrated} \approx 20$ μs.

Figures 5C, 5D:
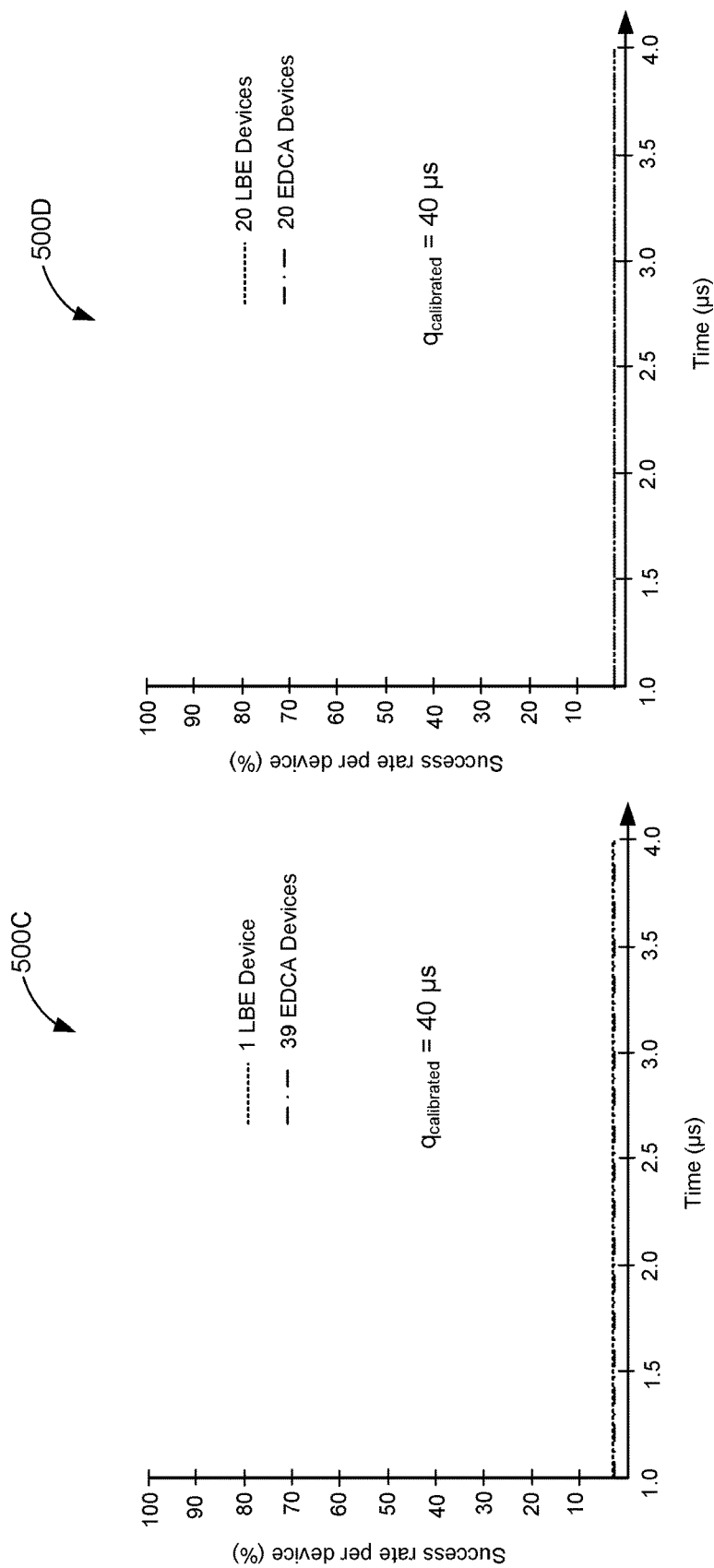

For another example, FIG. 5C shows an example graph 500C depicting example medium access success rates as a function of time for a wireless network including 1 LBE device and 39 EDCA devices contending for medium access. More specifically, the LBE device (not shown for simplicity) contends for medium access using a calibrated q value that may be determined in accordance with example embodiments (e.g., as described above with respect to FIG. 4), and the EDCA devices (not shown for simplicity) contend for medium access using the EDCA back-off mechanism defined in the IEEE 802.11e standards. As depicted in FIG. 5C, the LBE device and the EDCA devices each have a medium access success rate of approximately 3%. For the LBE device in the example of FIG. 5C, a $q_{calibrated} \approx 40$ μs.

For another example, FIG. 5D shows an example graph 500D depicting example medium access success rates as a function of time for a wireless network including 20 LBE devices and 20 EDCA devices contending for medium access. More specifically, the LBE devices (not shown for simplicity) contend for medium access using a calibrated q value that may be determined in accordance with example embodiments (e.g., as described above with respect to FIG. 4), and the EDCA devices (not shown for simplicity) contend for medium access using the EDCA back-off mechanism defined in the IEEE 802.11e standards. As depicted in FIG. 5D, the LBE devices and the EDCA devices each have a medium access success rate of approximately 3%. For the LBE devices in the example of FIG. 5D, $q_{calibrated} \approx 40$ μs.

For another example, FIG. 5E shows an example graph 500E depicting example medium access success rates as a function of time for a wireless network including 40 LBE devices contending for medium access. More specifically, the LBE devices (not shown for simplicity) contend for medium access using a calibrated q value that may be determined in accordance with example embodiments (e.g., as described above with respect to FIG. 4) As depicted in FIG. 5E, the LBE devices each have a medium access success rate of approximately 3%. For the LBE devices in the example of FIG. 5E, $q_{calibrated} \approx 40$ μs.

For another example, FIG. 5F shows an example graph 500F depicting example medium access success rates as a function of time for a wireless network including 2 LBE devices contending for medium access. More specifically, the LBE devices (not shown for simplicity) contend for medium access using a calibrated q value that may be determined in accordance with example embodiments (e.g., as described above with respect to FIG. 4) As depicted in FIG. 5F, the LBE devices each have a medium access success rate of approximately 3%. For the LBE devices in the example of FIG. 5F, $q_{calibrated} \approx 13$ μs.

The example graphs 500A-500F depicted in FIGS. 5A-5F, respectfully, correspond to calibrated q values determined using a damping factor (DF) set to 90% and using a moderation factor (MF) set to 10%. For other embodiments, other values for the damping factor (DF) and the moderation factor (MF) may be used. For example, as described above, increasing the values of the damping factor (DF) and the moderation factor (MF) may increase the rate with which the value of q is adjusted towards a target value (which may also increase jitter), while decreasing the values of the damping factor (DF) and the moderation factor (MF) may decrease the rate with which the value of q is adjusted towards the target value (which may reduce jitter).

Referring to FIGS. 5A-5F, the example embodiments may achieve the same (or at least similar) medium access success rates for LBE devices and EDCA devices regardless of the number of LBE devices or EDCA devices, for example, by selecting an appropriate calibrated q value ($q_{calibrated}$). Further, for at least some embodiments, the calibrated q value may be related to the total number of devices contending for medium access (e.g., rather than to the particular combination of LBE and EDCA devices). More specifically, in the examples of FIGS. 5A and 5F, which include 3 contending devices and 2 contending devices, respectively, similar medium access success rates between the LBE devices and the EDCA devices may be achieved with $q_{calibrated} \approx 13$ μs. In the example of FIG. 5B, which includes 10 contending devices, similar medium access success rates between the LBE devices and the EDCA devices may be achieved with $q_{calibrated} \approx 20$ μs. In the examples of FIGS. 5C-5E, which each include 40 contending devices, similar medium access success rates between the LBE devices and the EDCA devices may be achieved with $q_{calibrated} \approx 40$ μs.

Using the ANIPT as the success rate parameter upon which to determine calibrated q values that result in the same or similar medium access success rates for LBE and EDCA devices may also allow selected q values to be modified based on the number of contending devices. More specifically, if one or more selected q values (e.g., determined in the manner described above with respect to FIG. 4) do not result in the same or similar medium access success rates for LBE and EDCA devices, then a relationship between q offset values and ANIPT values may be used to converge the selected q values to calibrated q values that result in the same or similar medium access success rates. For example embodiments described herein, the q offset value may increase as the number of contending devices decreases, and may decrease as the number of contending devices increases. Thus, the rate with which a given q value may converge to a corresponding calibrated q value may be faster for wireless networks having a relatively small number of contending devices than for wireless networks having a relatively large number of contending devices.

Figure 6A:
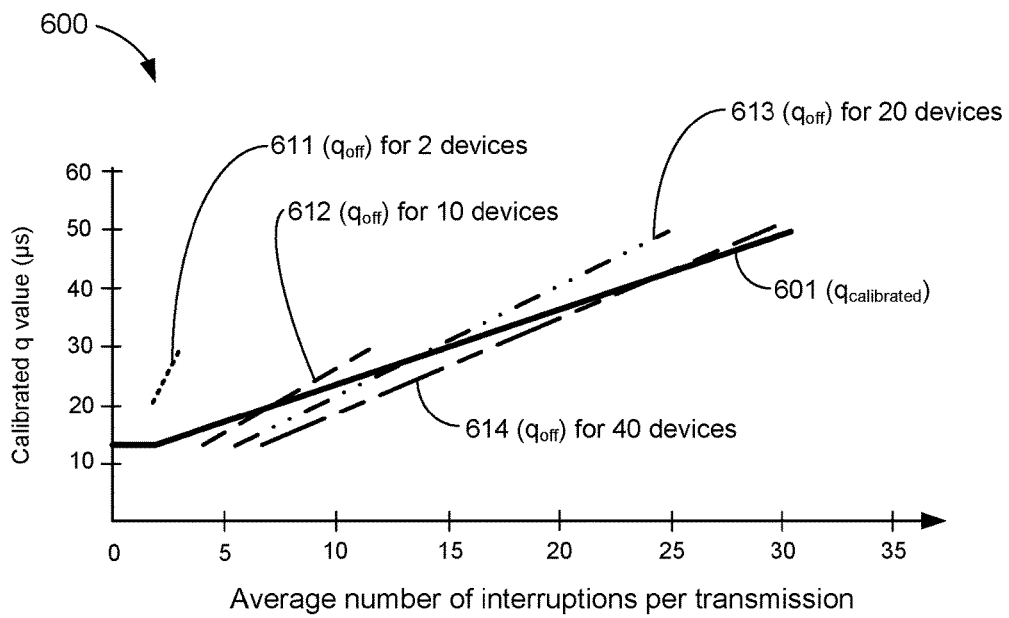
FIG. 6A depicts an example relationship between calibrated contention window sizes for LBE devices and contention window offset values as a function of the average number of interruptions per transmission, in accordance with example embodiments.

FIG. 6A shows a graph 600 depicting an example relationship between calibrated q values and ANIPT values relative to example relationships between q offset values and ANIPT values for various numbers of contending devices. A calibrated q graph 601 depicting calibrated q values ($q_{calibrated}$) as a function of ANIPT values may be determined in the manner described above with respect to FIG. 4. In some environments, a selected q value that defines the LBE contention window size may not result in LBE devices having the same (or similar) medium access success rates as EDCA devices. For example, a first q offset value plot 611 depicts q offset values ($q_{offset}$) as a function of ANIPT values for a wireless network including 2 contending devices, a second q offset value plot 612 depicts q offset values as a function of ANIPT values for a wireless network including 10 contending devices, a third q offset value plot 613 depicts q offset values as a function of ANIPT values for a wireless network including 20 contending devices, and a fourth q offset value plot 614 depicts q offset values as a function of ANIPT values for a wireless network including 40 contending devices.

Figure 6B:
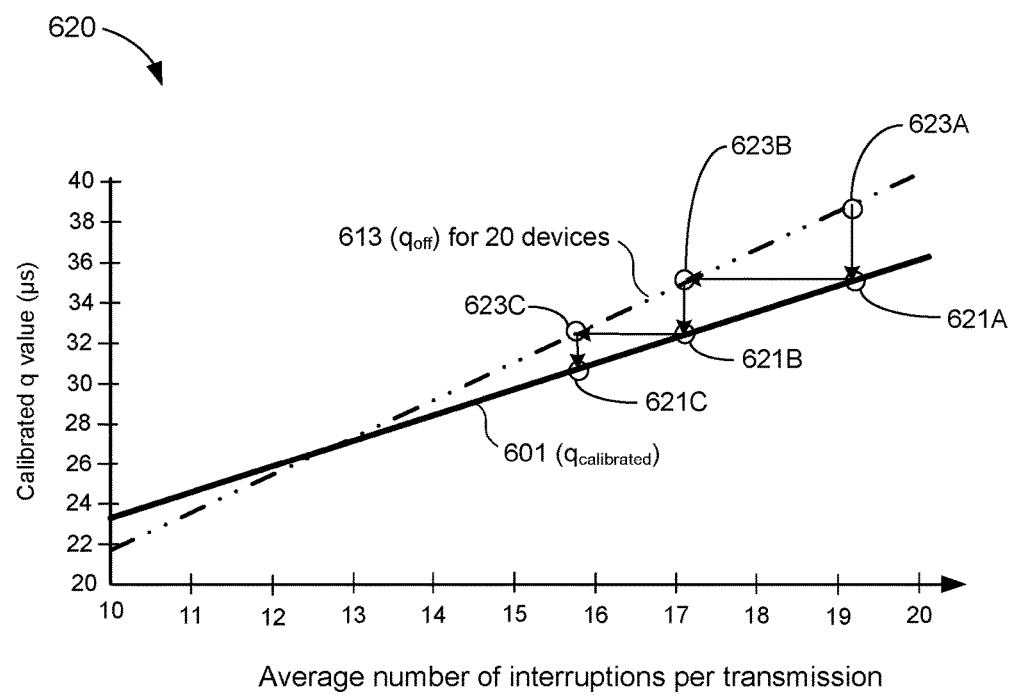
FIG. 6B depicts an example operation for converging a contention window size to a target value for LBE devices, in accordance with example embodiments.

The example q offset value plots 611-614 of FIG. 6A may be used to converge a given q value to a corresponding calibrated q value that results in the same (or similar) medium access success rates for both LBE devices and EDCA devices. For example, FIG. 6B depicts an example operation 620 for converging the value of q to the calibrated q value using the third q offset value plot 613 corresponding to 20 contending devices. The operation 620 of FIG. 6B may be based on the calibrated q graph 601 of FIG. 6A. For any given point on the q offset value plot 613, converging the value of q to a corresponding point on the calibrated q graph 601 may result in a decrease in the value of ANIPT. For one example, for an ANIPT value of approximately 19, the value of q may be incorrectly set to approximately 39 µs (as indicated by point 623A on the q offset value plot 613), whereas the corresponding calibrated q value is approximately 35 µs (as indicated by point 621A on the calibrated q graph 601). Thus, for an ANIPT value of approximately 19, the value of q is approximately 4 µs offset from the calibrated q value. For another example, for an ANIPT value of approximately 17, the value of q may be incorrectly set to approximately 35 µs (as indicated by point 623B on the q offset value plot 613), whereas the corresponding calibrated q value is approximately 32 µs (as indicated by point 621B on the calibrated q graph 601). Thus, for an ANIPT value of approximately 17, the value of q is approximately 3 µs offset from the calibrated q value. For yet another example, for an ANIPT value of approximately 16, the value of q may be incorrectly set to approximately 33 µs (as indicated by point 623C on the q offset value plot 613), whereas the corresponding calibrated q value is approximately 30 µs (as indicated by point 621C on the calibrated q graph 601). Thus, for an ANIPT value of approximately 16, the value of q is approximately 3 µs offset from the calibrated q value.

Figure 7:
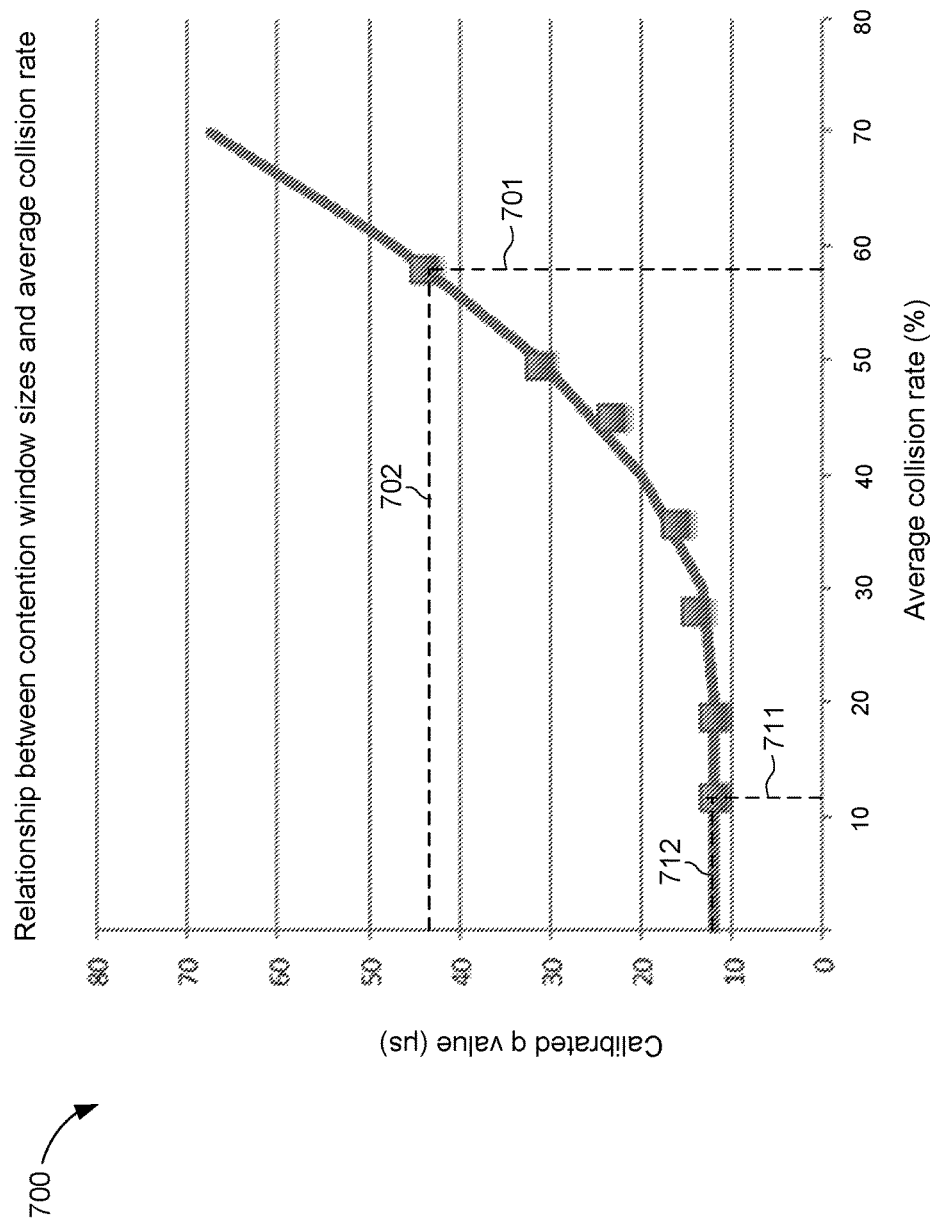
FIG. 7 depicts an example relationship between calibrated contention window sizes for LBE devices and an average collision rate, in accordance with example embodiments.

As mentioned above, for other implementations, the average collision rate may be the selected success rate parameter. For example, FIG. 7 shows a calibrated q graph 700 depicting an example relationship between calibrated q values and the average collision rate on a shared wireless medium during medium access contention operations. As shown in the example calibrated q graph 700 of FIG. 7, the calibrated q value increases as the average collision rate increases. More specifically, as the average collision rate increases (e.g., indicating an increasing level of contention on the shared wireless medium), the likelihood of EDCA devices employing an exponential back-off procedure also increases, which as discussed above may put EDCA devices at a disadvantage relative to LBE devices when contending for medium access.

Thus, in accordance with example embodiments, the size of the contention window from which LBE device 300 selects a random back-off number for medium access contention operations may be adjusted (e.g., increased) based on the calibrated q graph 700. In this manner, the LBE device 300 may increase its back-off period based, at least in part, on a selected calibrated q value so that medium access success rates for the LBE device 300 are the same (or at least similar) to the medium access success rate of EDCA devices. For example, in an implementation using the example calibrated q graph 700, if the average collision rate is a relatively high value of approximately 58, then a relatively high calibrated q value of approximately 43 µs may define the contention window size from which LBE device 300 selects its random back-off number for medium access contention operations (as indicated by lines 701-702).

Conversely, as shown in FIG. 7, the calibrated q value decreases as the average collision rate decreases. More specifically, as the average collision rate decreases (e.g., indicating a decreasing level of contention on the shared wireless medium), the likelihood of EDCA devices employing an exponential back-off procedure also decreases, which as discussed above may reduce the differences in medium access success rates between EDCA devices and LBE devices. For example, in an implementation using the example calibrated q graph 700, if the average collision rate is a relatively low value of approximately 11, then a relatively low calibrated q value of approximately 11 µs may define the contention window size from which LBE device 300 selects its random back-off number for medium access contention operations (as indicated by lines 711-712).

The calibrated q graph 700 of FIG. 7 may be determined by observing, for a given number of devices, the medium access success rates of LBE devices compared to EDCA devices. Then, the value of q (e.g., the LBE contention window size) may be adjusted until the medium access success rates are the same (or at least similar) for LBE devices and EDCA devices. The resultant value of q may then be designated as the calibrated q value. The calibrated q values may be plotted as a function of the moving average of the collision rate, for example, to generate the example calibrated q graph 700 of FIG. 7.

Thereafter, when an LBE device 300 is contending for medium access, the LBE device 300 may measure, obtain, or otherwise determine the average collision rate, and then select a corresponding calibrated q value from the calibrated q graph 700. The LBE device 300 may then use the selected calibrated q value (rather than the fixed q value) to define the contention window size from which to select a random back-off number for medium access contention operations.

For example, Table 2 below lists a number of example pairs of calibrated q values and average collision rates (ACRs) from which the example calibrated q graph 700 of FIG. 7 may be determined.

TABLE 2

| Devices | ACR | Calibrated q (µs) |
|---|---|---|
| 2 | 0.12 | 12 |
| 3 | 0.19 | 12 |
| 6 | 0.28 | 14 |
| 15 | .45 | 23 |
| 20 | 0.5 | 31 |
| 40 | 0.58 | 44 |

More specifically, for some implementations, the pairs of calibrated q values and ACR values shown above in Table 2 may be used to determine the value of $q_{target}$ using the below expression (where "max{a,b} equals the greater of a and b):

$$\text{if ACR}<0.21, \text{ then } q_{target}=12 \qquad (EQ. 5)$$

$$\text{else } q_{target}=\max\{12, 229.9096*ACR^2 - 94.3678*ACR + 2.8437\}$$

Figure 8:
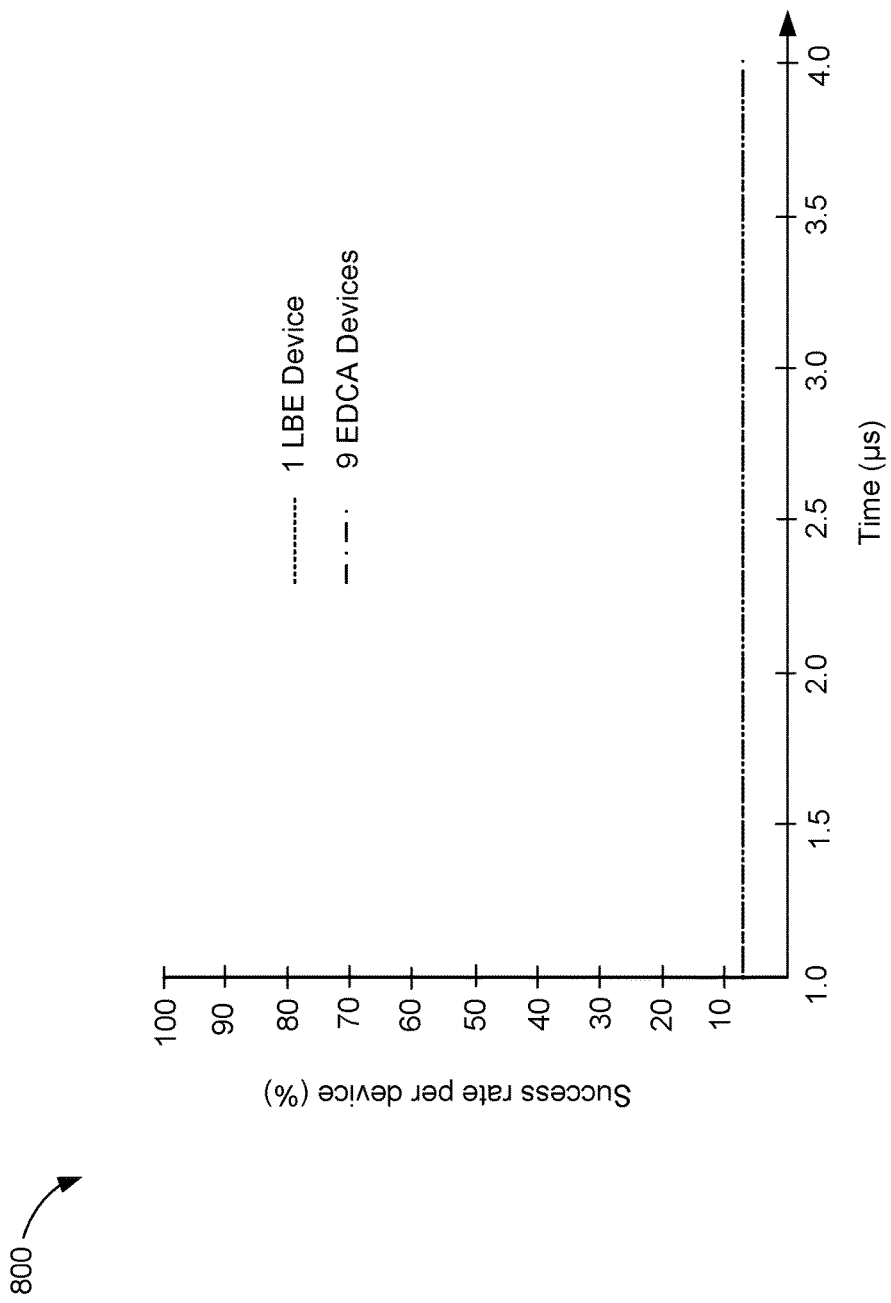
FIG. 8 depicts example medium access success rates for LBE devices that adjust their contention window sizes based on the graph of FIG. 7 and example medium access success rates for EDCA devices, in accordance with example embodiments.

FIG. 8 shows an example graph 800 depicting example medium access success rates as a function of time for a wireless network including 1 LBE device and 9 EDCA devices contending for medium access. More specifically, the 1 LBE device (not shown for simplicity) contends for medium access using a calibrated q value that may be determined in accordance with example embodiments (e.g., as described above with respect to FIG. 7), and the EDCA devices (not shown for simplicity) contend for medium access using the EDCA back-off mechanism. As depicted in FIG. 8, the 1 LBE device and the 9 EDCA devices each have a medium access success rate of approximately 8%. For the example of FIG. 8, the damping factor is set to 90% and the moderation factor is set to 10%.

As mentioned above, for other implementations, the average time between medium busy events on the shared wireless medium may be the selected success rate parameter. For such implementations, determination of calibrated q values may also be based upon additional information such as, for example, a number of different observed MAC addresses, a histogram of different observed modulation and coding schemes (MCSs), and/or received signal strength indicator (RSSI) values.

FIG. 9 shows an illustrative flowchart depicting an example operation 900 for ensuring equal medium access between a first wireless device associated with a load based equipment (LBE) protocol and a number of second wireless devices associated with an enhanced distributed channel access (EDCA) protocol. As discussed above, the LBE protocol may be defined by a European Telecommunications Standards Institute (ETSI) Broadband Access Network (BRAN) for LBE standard, and may prescribe a fixed contention window size for all medium access contention operations regardless of collisions. The EDCA protocol may be defined by the IEEE 802.11(e) standard, and may prescribe doubling the contention window size for each subsequent medium access contention operation resulting from collisions on the wireless medium.

For the example of FIG. 9, the first wireless device may be LBE device 300 of FIG. 3, and one or more of the second wireless devices may be EDCA device 200 of FIG. 2. Thus, as described above, the first wireless device may be associated with a channel access mechanism that maintains a fixed contention window size for medium access contention operations regardless of collisions, and the second wireless devices may be associated with a channel access mechanism that employs an exponential back-off procedure in the event of collisions.

The first wireless device may determine a level of contention associated with gaining access to a wireless medium (902). For some implementations, to determine the level of contention, the first wireless device may select a parameter indicative of a medium access success rate of the first wireless device (902A), and may then determine a moving average of the selected parameter, the moving average indicative of the level of contention (902B). The level of contention may indicate traffic levels on the wireless medium, congestion levels on the wireless medium, a likelihood of gaining medium access, and/or the number of devices contending for medium access. As discussed above, the selected parameter, which may indicate a medium access success rate, may be (i) the average number of interruptions per transmission, (ii) the average collision rate, or (iii) the average time between medium busy events.

The first wireless device may then select a contention window size based, at least in part, on the determined level of contention (904). For some implementations, to select the contention window size, the first wireless device may retrieve, from a memory, a calibrated contention window size value corresponding to the determined moving average (904A), and then define the selected contention window size based on the retrieved calibrated contention window size value (904B). As discussed above, the memory may store, for each of a plurality of moving averages of the selected parameter, a corresponding calibrated contention window size value that, when used to define the contention window size, results in similar medium access success rates for the first wireless device and the number of second wireless devices. In some aspects, the memory may store the calibrated q graph of FIG. 4 and/or the calibrated CW size graph of FIG. 7.

Next, the first wireless device may select, for a medium access contention operation, a random back-off number from a range of numbers defined by the selected contention window size (906). As discussed above, selecting the random back-off number from the range of numbers defined by the selected contention window size may ensure that LBE devices and EDCA devices have the same or similar medium access success rates. For some aspects, the EDCA devices may not alter their contention window sizes, and adhere to the exponential back-off procedure defined, for example, in the IEEE 802.11e standards.

As described above, for at least some embodiments, the first wireless device may decrease a slot time used for medium access contention operations and/or may increase its back-off period by a duration (908). In some aspects, the duration may be an Arbitration Interframe Space (AIFS) duration. In other aspects, the duration may be a number of SIFS durations, a number of PIFS durations, a DIFS duration, or any other suitable time period.

Thereafter, the first wireless device may dynamically adjust the selected contention window size based on changes in the level of contention (910). For example, after selecting the contention window size, the first wireless device may continue monitoring the wireless medium to detect changes in contention levels, and in response thereto may dynamically adjust the contention window size to ensure continued fairness between LBE devices and EDCA devices for medium access contention operations.

For other embodiments, the size of the contention window (CW) from which EDCA device 200 selects its random back-off number may be adjusted so that LBE devices and EDCA devices have the same or similar medium access success rates (e.g., rather than adjusting the size of the contention window used by the LBE devices). For example, the EDCA device 200 may determine a level of contention associated with gaining access to a wireless medium, may select a contention window size based, at least in part, on the determined level of contention, and may select a random back-off number from a range of numbers defined by the selected contention window size.

More specifically, in accordance with example embodiments, the CW size associated with EDCA device 200 may be adjusted based on observed collisions, transmission interruptions, and/or inter-CCA (clear channel assessment) busy times in a manner that ensures that LBE devices and EDCA devices have equal chances of gaining medium access. In some aspects, the EDCA device 200 may maintain a moving average of one or more success rate parameters such as, for example, (i) the average number of interruptions per transmission, (ii) the average collision rate, and (iii) the average time between medium busy events. For some implementations, the moving average (MA) may be determined as a simple (e.g., unweighted) moving average, for example, as described above with respect to EQ. 1. For other implementations, the moving average MA may be determined as a weighted moving average, for example, using a damping factors (DF) as described above with respect to EQ. 2 and/or using a moderation factor (MF) as described above with respect to EQ. 3.

Figure 10:
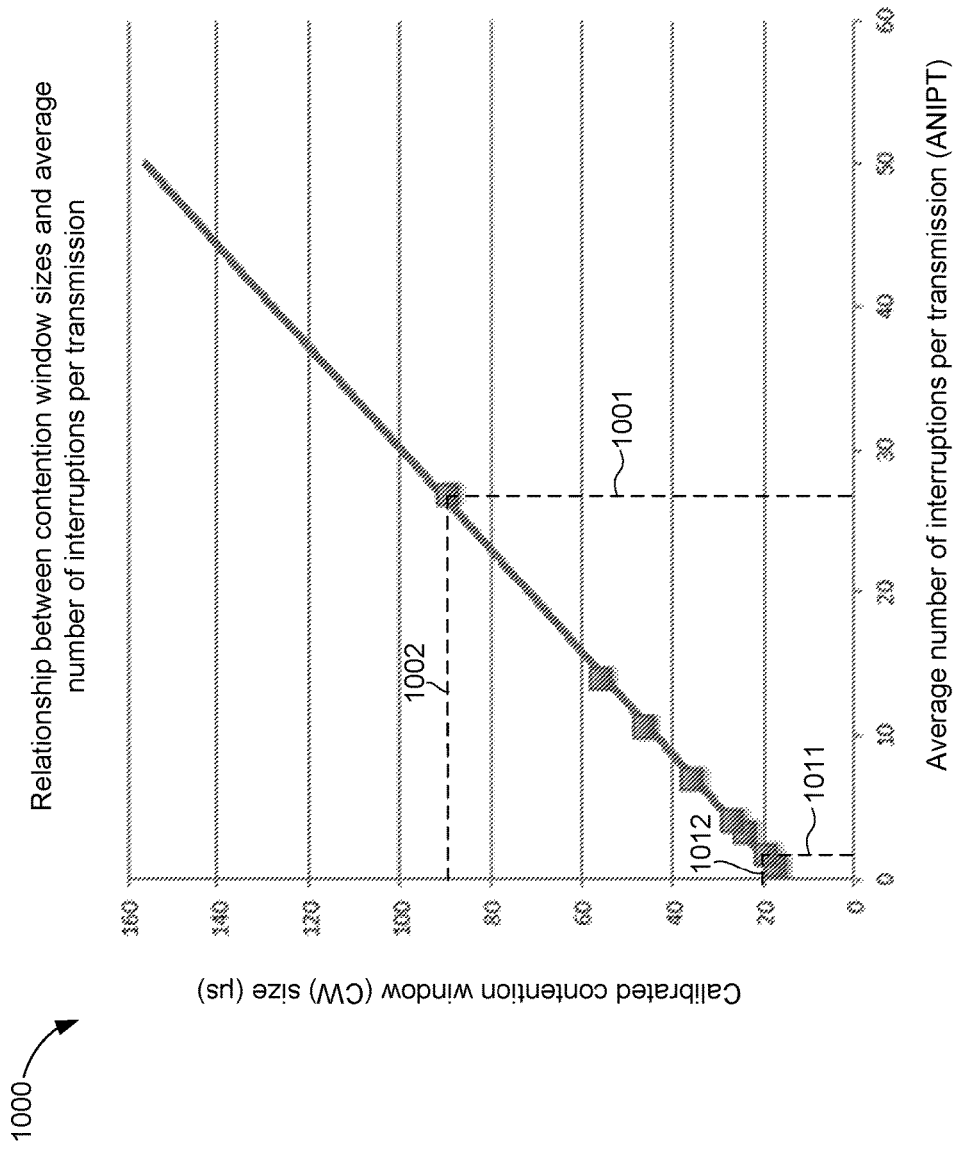
FIG. 10 depicts an example relationship between calibrated contention window sizes for EDCA devices and an average number of interruptions per transmission, in accordance with example embodiments.

FIG. 10 shows a calibrated CW size graph 1000 depicting an example relationship between calibrated CW sizes and the average number of interruptions per transmission (ANIPT). As shown in the example calibrated CW size graph 1000 of FIG. 10, the calibrated CW size increases as the average number of interruptions per transmission increases. More specifically, as the average number of interruptions per transmission increases (e.g., indicating an increasing level of contention on the shared wireless medium), the size of the contention window from which EDCA device 200 selects a random back-off number for medium access contention operations may be adjusted (e.g., increased) based on the example calibrated CW size graph 1000. In this manner, the EDCA device 200 may increase its back-off period based, at least in part, on the selected calibrated CW size so that medium access success rates for EDCA devices are the same (or at least similar) as the medium access success rates for LBE devices. For example, in an implementation using the example calibrated CW size graph 1000, if the average number of interruptions per transmission is a relatively high value of approximately 26, then a relatively high CW size of approximately 90 μs may define the contention window size from which EDCA device 200 selects its random back-off number for medium access contention operations (as indicated by lines 1001-1002).

Conversely, as shown in FIG. 10, the calibrated CW size decreases as the average number of interruptions per transmission decreases. More specifically, as the average number of interruptions per transmission decreases (e.g., indicating a decreasing level of contention on the shared wireless medium), the likelihood of EDCA devices employing an exponential back-off procedure also decreases, which as discussed above may reduce the differences in medium access success rates between EDCA devices and LBE devices. In this manner, the EDCA device 200 may decrease the size of the contention window from which the random back-off number is selected, which in turn may decrease the back-off period of EDCA device 200, for example, so that medium access success rates for the EDCA device 200 are the same (or at least similar) as the medium access success rates for LBE devices. For example, in an implementation using the example calibrated CW size graph 1000, if the average number of interruptions per transmission is a relatively low value of approximately 2, then a relatively low CW size of approximately 20 μs may define the contention window size from which EDCA device 200 selects its random back-off number for medium access contention operations (as indicated by lines 1011-1012).

Thus, while typical EDCA devices use a CW size that is initially set to a fixed minimum value (e.g., $CW_{min}$) and then doubled for each subsequent medium access contention operation, EDCA devices of the example embodiments may dynamically adjust the CW size based, at least in part, on the ANIPT (e.g., rather than employing an exponential back-off procedure).

The calibrated CW size graph 1000 of FIG. 10 may be determined by observing, for a given number of devices, the medium access success rates of EDCA devices compared to LBE devices. Then, the size of the CW from which EDCA device 200 selects its random back-off number may be adjusted until the medium access success rates are the same (or at least similar) for LBE devices and EDCA devices. The resultant CW size may then be designated as the calibrated CW size. A number of calibrated CW sizes may be plotted as a function of the moving average of the number of interruptions per transmission, for example, to generate the example calibrated CW size graph 1000 depicted in FIG. 10.

Thereafter, when EDCA device 200 is contending for medium access, the EDCA device 200 may measure, obtain, or otherwise determine an ANIPT value, and then select a corresponding calibrated CW size from the calibrated CW size graph 1000. The EDCA device 200 may then use the selected calibrated CW size from which to select a random back-off number for medium access contention operations (e.g., rather than using an exponential back-off procedure).

For example, Table 3 below lists a number of example pairs of calibrated CW sizes and ANIPT values from which the example calibrated CW size graph 1000 of FIG. 10 may be determined.

TABLE 3

| Devices | ANIPT | Calibrated Average CW (μs) |
| --- | --- | --- |
| 2 | 0.8904 | 17.1100 |
| 3 | 1.7252 | 19.4089 |
| 5 | 3.3118 | 24.2900 |
| 6 | 4.0809 | 26.6754 |
| 10 | 7.0437 | 35.7292 |
| 15 | 10.5701 | 46.2671 |
| 20 | 14.0023 | 55.6873 |
| 40 | 26.8387 | 89.7851 |

More specifically, for some implementations, the pairs of calibrated average CW sizes and the ANIPT values shown above in Table 3 may be used to determine the calibrated CW size ($CW_{calibrated}$) using the below expression:

$$CW_{calibrated} = 2.8150 * ANIPT + 15.2782 \qquad (EQ. 7)$$

For one example, FIG. 11A shows an example graph 1100A depicting example medium access success rates as a function of time for a wireless network including 1 EDCA device that dynamically adjusts its CW size (e.g., based at least in part on one or more measured ANIPT values) and 5 EDCA devices that do not dynamically adjust their CW sizes (e.g., 5 EDCA devices that use an exponential back-off procedure as defined by the IEEE 802.11e standards). As depicted in FIG. 11A, all contending EDCA devices have a medium access success rate of approximately 15%.

For another example, FIG. 11B shows an example graph 1100B depicting example medium access success rates as a function of time for a wireless network including 6 EDCA devices that dynamically adjust their CW sizes (e.g., based at least in part on one or more measured ANIPT values). As depicted in FIG. 11B, all contending EDCA devices have a medium access success rate of approximately 15%.

Figures 11C, 11D:
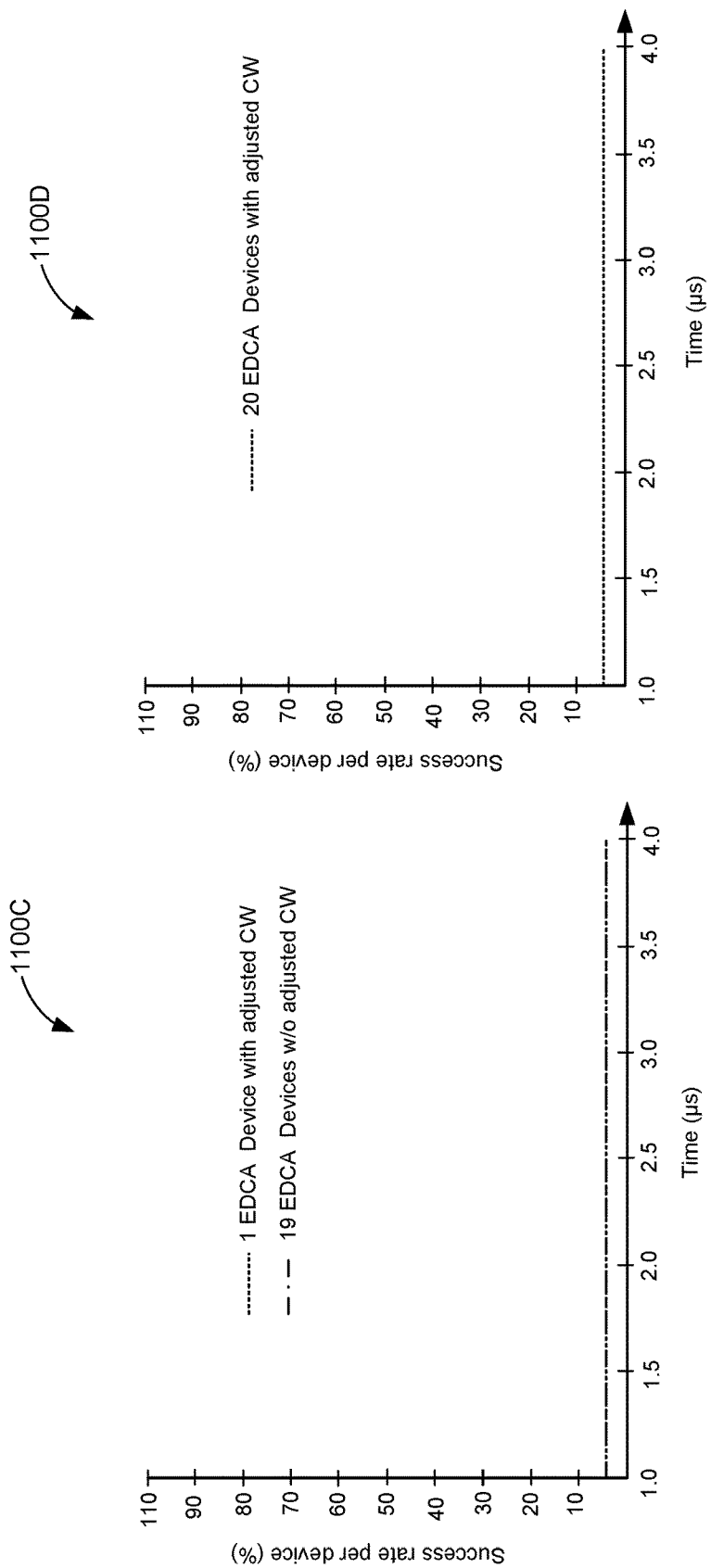

For another example, FIG. 11C shows an example graph 1100C depicting example medium access success rates as a function of time for a wireless network including 1 EDCA device that dynamically adjusts its CW size (e.g., based at least in part on one or more measured ANIPT values) and 19 EDCA devices that do not dynamically adjust their CW sizes. As depicted in FIG. 11C, all contending EDCA devices have a medium access success rate of approximately 5%.

For another example, FIG. 11D shows an example graph 1100D depicting example medium access success rates as a function of time for a wireless network including 20 EDCA devices that dynamically adjust their CW sizes (e.g., based at least in part on one or more measured ANIPT values). As depicted in FIG. 11D, all contending EDCA devices have a medium access success rate of approximately 5%.

Figures 11E, 11F:
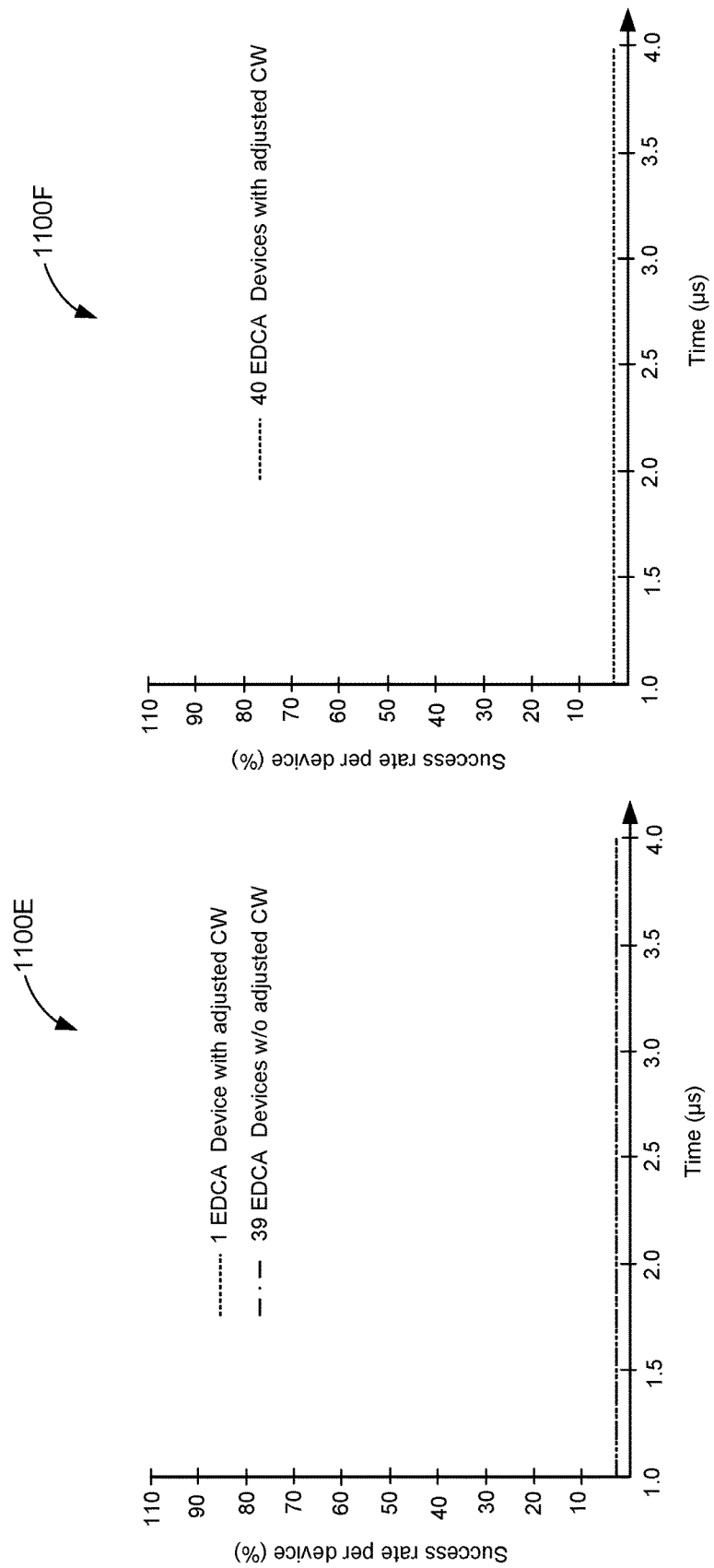

For another example, FIG. 11E shows an example graph 1100E depicting example medium access success rates as a function of time for a wireless network including 1 EDCA device that dynamically adjusts its CW size (e.g., based at least in part on one or more measured ANIPT values) and 39 EDCA devices that do not dynamically adjust their CW sizes. As depicted in FIG. 11E, all contending EDCA devices have a medium access success rate of approximately 4%.

For another example, FIG. 11F shows an example graph 1100F depicting example medium access success rates as a function of time for a wireless network including 40 EDCA devices that dynamically adjust their CW sizes (e.g., based at least in part on one or more measured ANIPT values). As depicted in FIG. 11F, all contending EDCA devices have a medium access success rate of approximately 4%.

Figure 11G:
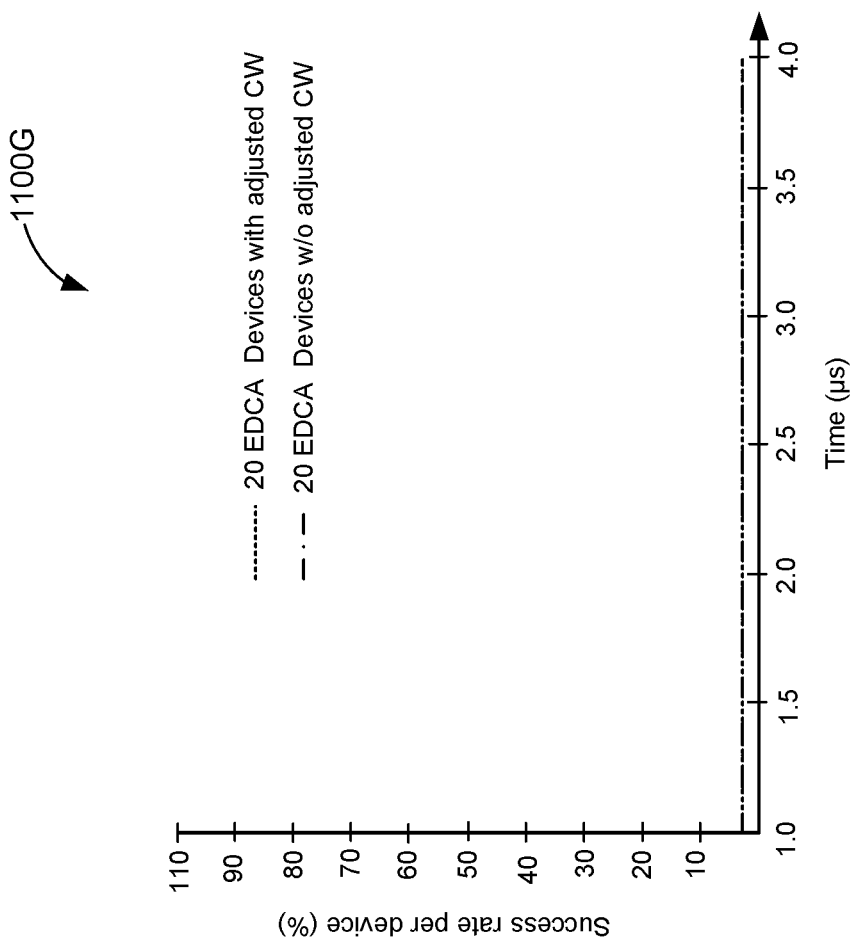

For another example, FIG. 11G shows an example graph 1100G depicting example medium access success rates as a function of time for a wireless network including 20 EDCA devices that dynamically adjust their CW sizes (e.g., based at least in part on one or more measured ANIPT values) and 20 EDCA devices that do not dynamically adjust their CW sizes. As depicted in FIG. 11G, all contending EDCA devices have a medium access success rate of approximately 4%.

The example graphs 1100A-1100G depicted in FIGS. 11A-11G, respectfully, correspond to calibrated CW sizes determined using a damping factor (DF) set to 90% and using a moderation factor (MF) set to 10%. For other embodiments, other values for the damping factor (DF) and the moderation factor (MF) may be used.

For some implementations, a relationship between the number of actively contending devices (n) and a selected parameter (e.g., one of the average number of interruptions per transmission (ANIPT), the average collision rate (ACR), and the inter-CCA busy time ($t_{busy}$)) may be used to verify that a particular wireless device is operating according to a specified medium access contention mechanism (e.g., EDCA with a truncated exponential back-off procedure). The particular device, which may hereinafter be referred to as the device-under-test (DUT), may be provided within a test network (either real or simulated), and the selected parameter as observed by the DUT may be verified as having the correct value, for the number of actively contending devices, that results in the same or similar medium access success rates for LBE and EDCA devices. In some aspects, if the selected parameter value cannot be observed by other devices not under test, then the observed parameter value at a test network node may be used to verify that the selected parameter value is within a range of the correct value for the number of actively contending devices.

An example first order relationship between the number of actively contending devices (n) and the average number of interruptions per transmission (ANIPT) may be expressed as ANIPT=0.9+0.6n. An example second order relationship between the number of actively contending devices (n) and ANIPT may be expressed as ANIPT=−0.0019n$^2$+0.731n−0.229.

An example first order relationship between the number of actively contending devices (n) and the number of interruptions per successful TXOP (ANIPST) may be expressed as ANIPST=1.80n−6.4. An example second order relationship between the number of actively contending devices (n) and ANIPST may be expressed as ANIPST=0.0072n$^2$+1.3386n−2.0871.

An example relationship between the number of actively contending devices (n) and the average collision probability (ACP) may be expressed as ACP=0.23+0.014n−0.0001 n$^2$.

An example relationship between $t_{busy}$ and the calibrated contention window size used by EDCA devices may be expressed as $CW_{calibrated}$=(8/(0.02*$t_{busy}$−1)) slots.

An example relationship between the average number of interruptions per transmission (ANIPT) and the EDCA contention window size may be expressed as $CW_{calibrated}$=(15+3.2*ANIPT) slots. Another example relationship between the average number of interruptions per transmission (ANIPT) and the EDCA contention window size may be expressed as $CW_{calibrated}$=(17+2.7*ANIPT) slots. Yet another example relationship between the average number of interruptions per transmission (ANIPT) and the EDCA contention window size may be expressed as $CW_{calibrated}$=−0.013*ANIPT 2+3.22*ANIPT+13.92.

An example second order relationship between the average collision probability (ACP) observed at the DUT and the EDCA contention window size may be expressed as $CW_{calibrated}$=(60−290ACP+588ACP$^2$) slots. An example exponential relationship between the average collision probability (ACP) observed at the DUT and the EDCA contention window size may be expressed as $CW_{calibrated}$=7.2836*e^(4.2865*ACP) slots.

In some embodiments, the inverse of a relationship between the number of actively contending devices and the value of a selected parameter as observed by a wireless device may be used to estimate the number of actively contending devices. The estimated number of actively contending devices (or the observed value of the selected parameter) may be used to adjust the limit of a maximum TXOP duration. In some aspects, the maximum TXOP duration may be increased as the number of actively contending devices decreases, and may be decreased as the number of actively contending devices increases.

For other implementations, device compliance may be verified by determining that an average contention window size $CW_{average}$=16.51+1.978n−0.0056n^2 and/or that the average number of interruptions per transmission ANIPT=−0.0019*n$^2$+0.731*n−0.229, where n is the number of devices simultaneously contending for medium access. The ANIPT value may be approximately equal to one less than the number of AIFS durations within the back-off period that resulted in a TXOP.

For other embodiments, device compliance may be verified by providing the device under test (DUT) and a testbed device (TD) within a wireless network. The TD may be a device employing an exponential back-off procedure for which $CW_{min}=CW_{max}$. For one example, setting $CW_{min}=CW_{max}=6$ slots may emulate the presence of 5 actively contending devices. For another example, setting $CW_{min}=CW_{max}=4$ slots may emulate the presence of 7 actively contending devices. For yet another example, setting $CW_{min}=CW_{max}=2$ slots may emulate the presence of 17 actively contending devices. The TD may count the number of interruptions during the back-off period (which represents successful TXOPs for the DUT) to verify that the DUT complies with a target ANIPT value. For example, deriving the target ANIPT value as $ANIPT_{target}=-0.0019*n^2+0.731*n-0.229$ may generate the values summarized below in Table 4:

TABLE 4

|  | TD CWmin = CWmax | | |
|---|---|---|---|
|  | 6 | 4 | 2 |
| Effective number of emulated nodes | 5 | 7 | 17 |
| DUT success rate | 0.19 | 0.11 | 0.03 |
| DUT average CW (slots) | 22.87 | 29.52 | 58.47 |
| DUT ACP | 0.25 | 0.34 | 0.50 |
| DUT ANIPT | 2.86 | 4.90 | 14.55 |
| DUT Interruptions per successful TXOP | 4.18 | 7.88 | 30.32 |
| Average back-off between TXOPs (µs) | 63.03 | 57.96 | 51.43 |

A fixed back-off period may also be employed by the TD. More specifically, if a fixed back-off period is employed by the TD, the TD may determine a probability distribution for AN IPT, for example, to characterize the degree of randomness at the DUT.

For yet other embodiments, device compliance may be verified by determining that the success rate at the TD is higher than a success rate threshold level ($SR_{threshold}$). The value of $SR_{threshold}$ may be determined by adding a reference device as the DUT in the test network, and then measuring the medium access success rate at the TD for the protocol-defined CW size and/or for a number of calibrated CW sizes. The medium access success rate at the TD may be determined to equal or correlate to the number of successful transmission attempts by the TD relative to the total number of transmission attempts at the TD. For one example, using a contention window size of 5 slot times (e.g., corresponding to the level of contention associated with approximately 7 EDCA devices), $SR_{threshold}\approx0.78$ (on a scale between 0 and 1). For another example, using a contention window size of 2 slot times (e.g., corresponding to the level of contention associated with approximately 17 EDCA devices), $S_{Rthreshold}\approx0.94$ (on a scale between 0 and 1).

For still other embodiments, device compliance may be verified by determining that the medium access success rate per second at the TD is higher than the value of $SR_{threshold}$. For such embodiments, the value of $SR_{threshold}$ may be determined by adding a reference device as the DUT to the test network, and then measuring the medium access success rate per second at the TD for the protocol-defined CW size and/or for a number of calibrated CW sizes. The medium access success rate per second may be defined as the number of successful transmission attempts by the TD per second.

In some aspects, the TD may switch to a smaller CW size during the test. An average value for $SR_{threshold}$ during the test may be determined by using the reference device as the DUT. More specifically, a DUT that reacts too slowly to the increased contention intensity (e.g., resulting from the smaller CW size) may fail the test.

As described above, LBE devices and/or EDCA devices may adjust the contention window size from which random back-off numbers are selected based on one or more selected success rate parameters. For other embodiments, LBE devices and/or EDCA devices may adjust their contention window sizes based on an observed success rate parameter and a doubling probability ($P_{double}$). The doubling probability may be used to selectively double the contention window size and/or to reset contention window size. In some aspects, the doubling probability may indicate the probability of collisions in a wireless network including devices that employ an exponential back-off procedure, and its use may hereinafter be referred to as the "exponential front end technique." As explained in more detail below, while conventional exponential back-off procedures (e.g., as defined in the IEEE 802.11e standards) automatically double the contention window size for each sequent medium access contention operation, the exponential front end technique disclosed herein selectively doubles or resets (e.g., to $CW_{min}$) the contention window size based on the doubling probability ($P_{double}$). In some aspects, the value of $P_{double}$ may be determined in response to an observed success rate parameter (rather than in response to actual collisions during medium access contention operations).

More specifically, in accordance with the exponential front end techniques disclosed herein, a wireless device may double the CW size with a probability indicated by $P_{double}$ until the CW size reaches $CW_{max}$, and may reset the CW size to $CW_{min}$ with a probability indicated by $(1-P_{double})$. In addition or as an alternative, the wireless device may reset the CW size to $CW_{min}$ when the number of medium access "retries" reaches a limit. As used herein, the number of medium access retries may be defined as the number of consecutive medium access contention operations for which the CW size is doubled.

An example relationship between the gap time ($t_{busy}$) and $P_{double}$ may be expressed as $P_{double}=0.000591*t_{busy}^2-0.0915*t_{busy}+3.649$. An example relationship between the ANIPT and $P_{double}$ may be expressed as $P_{double}=0.151*ANIPT+0.0913$. An example relationship between the observed collision rate ($P_c$) and $P_{double}$ may be expressed as $P_{double}=P_c$.

For other implementations, a wireless device may select a random CW size between upper and lower exponential boundaries relative to a target CW size, and may determine a value for $P_{double}$ based on a difference between the target CW size ($CW_{target}$) and each of the upper and lower exponential boundaries. In some aspects, the upper exponential boundary ($B_{upper}$) and the lower exponential boundary ($B_{lower}$) may be expressed as:

$$B_{upper}=2^{\text{ceiling}(\log_2(CW_{target}))-1}$$

$$B_{lower}=2^{\text{floor}(\log_2(CW_{target}))-1}$$

The probability ($P_{upper}$) to select the upper exponential boundary and the probability ($P_{lower}$) to select the lower exponential boundary may be expressed as:

$$P_{upper}=1-(CW_{target}-B_{lower})/(B_{upper}-B_{lower})$$

$$P_{lower}=1-P_{upper}$$

The value of $CW_{target}$ may be determined by using one or more of the calibration graphs described above, for example, with respect to FIGS. 4, 7, and 10.

For other implementations, a wireless device may adjust the CW size to sweep through exponential values between $CW_{min}$ and $CW_{max}$ based on the current and next average of the sweep, as follows:

if next average<$CW_{target}$
        double CW size up to $CW_{max}$
    else if current average<target CW<next average
        double CW size up to $CW_{max}$ with value of $P_{double}$
        $P_{double}$=($CW_{target}$−current average)/(next average−current average)
    else
        reset CW size to $CW_{min}$.

The sweep averages for exponential sweeps are summarized below in Table 5, where the CW size and the sweep average are expressed as a number of back-off slot times:

TABLE 5

| CW | | | | | | |
|---|---|---|---|---|---|---|
| 15 | 31 | 63 | 127 | 255 | 511 | 1023 |
| Sweep average 15.0 | 23.0 | 36.3 | 59.0 | 98.2 | 167.0 | 289.3 |

FIG. 12 shows an illustrative flowchart depicting an example operation 1200 for ensuring equal medium access between a first wireless device associated with an enhanced distributed channel access (EDCA) protocol and a number of second wireless devices associated with a load based equipment (LBE) protocol. As discussed above, the EDCA protocol may be defined by the IEEE 802.11e standard, and may prescribe doubling the contention window size for each subsequent medium access contention operation resulting from collisions on the wireless medium. The LBE protocol may be defined by a European Telecommunications Standards Institute (ETSI) Broadband Access Network (BRAN) for LBE standard, and may prescribe a fixed contention window size for all medium access contention operations regardless of collisions during medium access contention operations.

For the example of FIG. 12, the first wireless device may be EDCA device 200 of FIG. 2, and one or more of the second wireless devices may be LBE device 300 of FIG. 3. Thus, as described above, the first wireless device may be associated with a channel access mechanism that employs an exponential back-off procedure in the event of collisions, and the second wireless devices may be associated with a channel access mechanism that maintains a fixed contention window size for medium access contention operations regardless of collisions.

The first wireless device may determine a level of contention associated with gaining access to a wireless medium (1202). For some implementations, to determine the level of contention, the first wireless device may select a parameter indicative of a medium access success rate of the first wireless device (1202A), and may then determine a moving average of the selected parameter, the moving average indicative of the level of contention (1202B). The level of contention may indicate traffic levels on the wireless medium, congestion levels on the wireless medium, a likelihood of gaining medium access, and/or the number of devices contending for medium access. As discussed above, the selected parameter, which may indicate a medium access success rate, may be (i) the average number of interruptions per transmission, (ii) the average collision rate, or (iii) the average time between medium busy events.

The first wireless device may then select a contention window size based, at least in part, on the determined level of contention (1204). For some implementations, to select the contention window size, the first wireless device may retrieve, from a memory, a calibrated contention window size value corresponding to the determined moving average (1204A), and then define the selected contention window size based on the retrieved calibrated contention window size value (1204B). As discussed above, the memory may store, for each of a plurality of moving averages of the selected parameter, a corresponding calibrated contention size value that, when used to define the contention window size, results in similar medium access success rates for the first wireless device and the number of second wireless devices. In some aspects, the memory may store the calibrated CW size graph of FIG. 10.

Next, the first wireless device may select, for a medium access contention operation, a random back-off number from a range of numbers defined by the selected contention window size (1206). As discussed above, selecting the random back-off number from the range of numbers defined by the selected contention window size may ensure that LBE devices and EDCA devices have the same or similar medium access success rates.

Thereafter, the first wireless device may dynamically adjust the selected contention window size based on one or more conditions (1208). For example, after selecting the contention window size, the first wireless device may continue monitoring the wireless medium to detect changes in contention levels, and in response thereto may dynamically adjust the contention window size to ensure continued fairness between LBE devices and EDCA devices for medium access contention operations. Dynamically adjusting the selected contention window size is described in more detail below with respect to FIGS. 13A-13B.

The first wireless device may validate the selected contention window size (1210). For some implementations, the validation may be performed by determining a relationship between a parameter indicative of medium access success rates and various numbers of actively contending wireless devices, and then verifying that the selected contention window size results in equal medium access based on the relationship.

The first wireless device may also determine how many wireless devices are actively contending for medium access, for example, by determining an inverse of the relationship between the parameter and the various numbers of actively contending wireless devices and then estimating how many wireless devices are actively contending for medium access based on the inverse of the relationship (1212).

As mentioned above, the first wireless device may continue monitoring the wireless medium to detect changes in contention levels, and in response thereto may dynamically adjust the selected contention window size to ensure continued fairness between LBE devices and EDCA devices for medium access contention operations. For one example, FIG. 13A shows an illustrative flowchart depicting an example operation 1300 for dynamically adjusting the selected contention window size. The first wireless device may increase the selected contention window size based on an increasing number of wireless devices actively contending for medium access (1302), and may decrease the selected contention window size based on a decreasing number of wireless devices actively contending for medium access (1304).

For another example, FIG. 13B shows an illustrative flowchart depicting an example operation 1310 for dynamically adjusting the selected contention window size. The first wireless device may first determine a probability of collisions resulting from a plurality of the first wireless devices simultaneously contending for medium access (1312). Then, the first wireless device may double the contention window size based on the probability (1314), and/or may reset the contention window size to a minimum value based on the probability (1316).

In the foregoing specification, the example embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense. For example, method steps depicted in the flow charts of FIGS. 11-12 may be performed in other suitable orders and/or one or more method steps may be omitted.

What is claimed is:

1. In a wireless network, a method for ensuring equal medium access between a first wireless device associated with a load based equipment (LBE) protocol and a number of second wireless devices associated with an enhanced distributed channel access (EDCA) protocol, the method performed by the first wireless device and comprising:
    determining a level of contention associated with gaining access to a wireless medium, the determined level of contention indicating a likelihood of gaining medium access;
    selecting a contention window size based, at least in part, on the determined level of contention;
    selecting, for a medium access contention operation, a random back-off number from a range of numbers defined by the selected contention window size; and
    performing the medium access contention operation using the random back-off number wherein the LBE protocol prescribes a fixed contention window size for all medium access contention operations regardless of collisions during the medium access contention operation, and the EDCA protocol prescribes doubling the contention window size for each subsequent medium access contention operation resulting from collisions on the wireless medium.

2. The method of claim 1, wherein the LBE protocol is defined by a European Telecommunications Standards Institute (ETSI) Broadband Access Network (BRAN) for LBE standard, and the EDCA protocol is defined by an IEEE 802.11 standard.

3. The method of claim 1, wherein the second wireless devices are configured to use an exponential back-off procedure for collision avoidance.

4. The method of claim 1, wherein determining the level of contention comprises:
    selecting a parameter indicative of a medium access success rate of the first wireless device; and
    determining a moving average of the selected parameter, the moving average indicative of the level of contention.

5. The method of claim 4, wherein the selected parameter is at least one member of the group consisting of an average number of interruptions per transmission, an average collision rate on the wireless medium, and an average time between busy events on the wireless medium.

6. The method of claim 4, wherein selecting the contention window size comprises:
    retrieving, from a memory, a calibrated contention window size value corresponding to the determined moving average; and
    defining the selected contention window size based on the retrieved calibrated contention window size value.

7. The method of claim 6, wherein the memory stores, for each of a plurality of moving averages of the selected parameter, a corresponding calibrated contention window size value that, when used to define the contention window size, results in similar medium access success rates for the first wireless device and the number of second wireless devices.

8. The method of claim 1, further comprising:
    decreasing a slot time used by the first wireless device; and
    increasing a back-off period of the first wireless device by a duration.

9. The method of claim 8, wherein the duration comprises an Arbitration Interframe Space (AIFS) duration.

10. The method of claim 1, further comprising:
    dynamically adjusting the selected contention window size based on changes in the determined level of contention.

11. A first wireless device associated with a load based equipment (LBE) protocol and configured to ensure equal medium access with a number of second wireless devices associated with an enhanced distributed channel access (EDCA) protocol, the first wireless device comprising:
    one or more processors; and
    a memory configured to store instructions that, when executed by the one or more processors, cause the first wireless device to:
        determine a level of contention associated with gaining access to a wireless medium, the determined level of contention indicating a likelihood of gaining medium access;
        select a contention window size based, at least in part, on the determined level of contention;
        select, for a medium access contention operation, a random back-off number from a range of numbers defined by the selected contention window size; and
        perform the medium access contention operation using the random back-off number, wherein the LBE protocol prescribes a fixed contention window size for all medium access contention operations regardless of collisions during the medium access contention operation, and the EDCA protocol prescribes doubling the contention window size for each subsequent medium access contention operation resulting from collisions on the wireless medium.

12. The first wireless device of claim 11, wherein execution of the instructions to determine the level of contention causes the first wireless device to:
    select a parameter indicative of a medium access success rate of the first wireless device;
    and determine a moving average of the selected parameter, the moving average indicative of the level of contention.

13. The first wireless device of claim 12, wherein the selected parameter is at least one member of the group consisting of an average number of interruptions per transmission, an average collision rate on the wireless medium, and an average time between busy events on the wireless medium.

14. The first wireless device of claim 12, wherein execution of the instructions to select the contention window size causes the first wireless device to:

retrieve, from a memory, a calibrated contention window size value corresponding to the determined moving average; and define the selected contention window size based on the retrieved calibrated contention window size value.

15. The first wireless device of claim 14, wherein the memory is configured to store, for each of a plurality of moving averages of the selected parameter, a corresponding calibrated contention window size value that, when used to define the contention window size, results in similar medium access success rates for the first wireless device and the number of second wireless devices.

16. The first wireless device of claim 11, wherein execution of the instructions causes the first wireless device to further:

decrease a slot time used by the first wireless device; and increase a back-off period of the first wireless device by a duration.

17. The first wireless device of claim 11, wherein execution of the instructions causes the first wireless device to further:

dynamically adjust the selected contention window size based on changes in the determined level of contention.

18. A first wireless device associated with a load based equipment (LBE) protocol and configured to ensure equal medium access with a number of second wireless devices associated with an enhanced distributed channel access (EDCA) protocol, the first wireless device comprising:

means for determining a level of contention associated with gaining access to a wireless medium, the determined level of contention indicating a likelihood of gaining medium access;

means for selecting a contention window size based, at least in part, on the determined level of contention;

means for selecting, for a medium access contention operation, a random back-off number from a range of numbers defined by the selected contention window size; and means for performing the medium access contention operation using the random back-off number, wherein the LBE protocol prescribes a fixed contention window size for all medium access contention operations regardless of collisions during the medium access contention operation, and the EDCA protocol prescribes doubling the contention window size for each subsequent medium access contention operation resulting from collisions on the wireless medium.

19. The first wireless device of claim 18, further comprising:

means for selecting a parameter indicative of a medium access success rate of the first wireless device; and means for determining a moving average of the selected parameter, the moving average indicative of the level of contention.

20. The first wireless device of claim 19, wherein the selected parameter is at least one member of the group consisting of an average number of interruptions per transmission, an average collision rate on the wireless medium, and an average time between busy events on the wireless medium.

21. The first wireless device of claim 19, wherein the means for selecting the contention window size is to:

retrieve, from a memory, a calibrated contention window size value corresponding to the determined moving average; and define the selected contention window size based on the retrieved calibrated contention window size value.

22. The first wireless device of claim 21, wherein the memory is configured to store, for each of a plurality of moving averages of the selected parameter, a corresponding calibrated contention window size value that, when used to define the contention window size, results in similar medium access success rates for the first wireless device and the number of second wireless devices.

23. The first wireless device of claim 18, further comprising:

means for dynamically adjusting the selected contention window size based on changes in the determined level of contention.

24. A non-transitory computer-readable storage medium storing one or more programs containing instructions that, when executed by one or more processors of a first wireless device associated with a load based equipment (LBE) protocol, cause the first wireless device to ensure equal medium access with a number of second wireless devices associated with an enhanced distributed channel access (EDCA) protocol by performing operations comprising:

determining a level of contention associated with gaining access to a wireless medium, the determined level of contention indicating a likelihood of gaining medium access;

selecting a contention window size based, at least in part, on the determined level of contention;

selecting, for a medium access contention operation, a random back-off number from a range of numbers defined by the selected contention window size; and performing the medium access contention operation using the random back-off number wherein the LBE protocol prescribes a fixed contention window size for all medium access contention operations regardless of collisions during the medium access contention operation, and the EDCA protocol prescribes doubling the contention window size for each subsequent medium access contention operation resulting from collisions on the wireless medium.

25. The non-transitory computer-readable storage medium of claim 24, wherein execution of the instructions to determine the level of contention causes the first wireless device to perform operations further comprising:

selecting a parameter indicative of a medium access success rate of the first wireless device; and determining a moving average of the selected parameter, the moving average indicative of the level of contention.

26. The non-transitory computer-readable storage medium of claim 25, wherein execution of the instructions to select the contention window size causes the first wireless device to perform operations further comprising:

retrieving, from a memory, a calibrated contention window size value corresponding to the determined moving average; and defining the selected contention window size based on the retrieved calibrated contention window size value.

27. The non-transitory computer-readable storage medium of claim 26, wherein the memory is configured to store, for each of a plurality of moving averages of the selected parameter, a corresponding calibrated contention window size value that, when used to define the contention window size, results in similar medium access success rates for the first wireless device and the number of second wireless devices.

28. The non-transitory computer-readable storage medium of claim 24, wherein execution of the instructions causes the first wireless device to perform operations further comprising:
   dynamically adjust the selected contention window size based on changes in the determined level of contention.

\* \* \* \* \*